(12) United States Patent
Draper et al.

(10) Patent No.: US 8,482,223 B2
(45) Date of Patent: Jul. 9, 2013

(54) CALIBRATION OF LAMPS

(75) Inventors: William A. Draper, Austin, TX (US);
Robert T. Grisamore, Austin, TX (US);
John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 369 days.

(21) Appl. No.: 12/433,222

(22) Filed: Apr. 30, 2009

(65) Prior Publication Data
US 2010/0277072 A1    Nov. 4, 2010

(51) Int. Cl.
*G05F 1/00*    (2006.01)

(52) U.S. Cl.
USPC ......... 315/307; 315/297; 315/308; 315/209 R

(58) Field of Classification Search
USPC ................. 315/291, 307, 294, 297, 299, 308, 315/312, 326
See application file for complete search history.

(56) References Cited

U.S. PATENT DOCUMENTS

| | | |
|---|---|---|
| 3,316,495 A | 4/1967 | Sherer |
| 3,423,689 A | 1/1969 | Miller et al. |
| 3,586,988 A | 6/1971 | Weekes |
| 3,725,804 A | 4/1973 | Langan |
| 3,790,878 A | 2/1974 | Brokaw |
| 3,881,167 A | 4/1975 | Pelton et al. |
| 4,075,701 A | 2/1978 | Hofmann |
| 4,334,250 A | 6/1982 | Theus |
| 4,409,476 A | 10/1983 | Lofgren et al. |
| 4,414,493 A | 11/1983 | Henrich |
| 4,476,706 A | 10/1984 | Hadden et al. |
| 4,523,128 A | 6/1985 | Stamm |
| 4,677,366 A | 6/1987 | Wilkinson et al. |
| 4,683,529 A | 7/1987 | Bucher |
| 4,700,188 A | 10/1987 | James |
| 4,797,633 A | 1/1989 | Humphrey |
| 4,937,728 A | 6/1990 | Leonardi |
| 4,940,929 A | 7/1990 | Williams |
| 4,973,919 A | 11/1990 | Allfather |
| 4,979,087 A | 12/1990 | Sellwood et al. |
| 4,980,898 A | 12/1990 | Silvian |
| 4,992,919 A | 2/1991 | Lee et al. |

(Continued)

FOREIGN PATENT DOCUMENTS

| | | |
|---|---|---|
| DE | 19713814 | 4/1997 |
| DE | 19713814 | 10/1998 |

(Continued)

OTHER PUBLICATIONS

Freescale Semiconductor, Inc., Dimmable Light Ballast with Power Factor Correction, Design Reference Manual, DRM067, Rev. 1, Dec. 2005.

(Continued)

*Primary Examiner* — Douglas W Owens
*Assistant Examiner* — Jianzi Chen
(74) *Attorney, Agent, or Firm* — Terrile, Cannatti, Chambers & Holland, LLP; Kent B. Chambers

(57) ABSTRACT

In at least one embodiment, a lamp includes a controller configured to generate power control signals for a lamp is also configured to receive lamp calibration data received via one or more power terminals of the lamp. The controller is configured to process the calibration data to calibrate the lamp. In at least one embodiment, the lamp includes one or more light emitting diodes.

33 Claims, 12 Drawing Sheets

U.S. PATENT DOCUMENTS

| | | | |
|---|---|---|---|
| 4,994,952 A | 2/1991 | Silva et al. | |
| 5,001,620 A | 3/1991 | Smith | |
| 5,055,746 A | 10/1991 | Hu et al. | |
| 5,109,185 A | 4/1992 | Ball | |
| 5,121,079 A | 6/1992 | Dargatz | |
| 5,206,540 A | 4/1993 | de Sa e Silva et al. | |
| 5,264,780 A | 11/1993 | Bruer et al. | |
| 5,278,490 A | 1/1994 | Smedley | |
| 5,323,157 A | 6/1994 | Ledzius et al. | |
| 5,359,180 A | 10/1994 | Park et al. | |
| 5,383,109 A | 1/1995 | Maksimovic et al. | |
| 5,424,932 A | 6/1995 | Inou et al. | |
| 5,477,481 A | 12/1995 | Kerth | |
| 5,479,333 A | 12/1995 | McCambridge et al. | |
| 5,481,178 A | 1/1996 | Wilcox et al. | |
| 5,565,761 A | 10/1996 | Hwang | |
| 5,589,759 A | 12/1996 | Borgato et al. | |
| 5,638,265 A | 6/1997 | Gabor | |
| 5,691,890 A | 11/1997 | Hyde | |
| 5,747,977 A | 5/1998 | Hwang | |
| 5,757,635 A | 5/1998 | Seong | |
| 5,764,039 A | 6/1998 | Choi et al. | |
| 5,768,111 A | 6/1998 | Zaitsu | |
| 5,781,040 A | 7/1998 | Myers | |
| 5,783,909 A | 7/1998 | Hochstein | |
| 5,798,635 A | 8/1998 | Hwang et al. | |
| 5,900,683 A | 5/1999 | Rinehart et al. | |
| 5,912,812 A | 6/1999 | Moriarty, Jr. | |
| 5,929,400 A | 7/1999 | Colby et al. | |
| 5,946,202 A | 8/1999 | Balogh | |
| 5,946,206 A | 8/1999 | Shimizu et al. | |
| 5,952,849 A | 9/1999 | Haigh et al. | |
| 5,960,207 A | 9/1999 | Brown | |
| 5,962,989 A | 10/1999 | Baker | |
| 5,963,086 A | 10/1999 | Hall | |
| 5,966,297 A | 10/1999 | Minegishi | |
| 5,994,885 A | 11/1999 | Wilcox et al. | |
| 6,016,038 A | 1/2000 | Mueller et al. | |
| 6,043,633 A | 3/2000 | Lev et al. | |
| 6,072,969 A | 6/2000 | Yokomori et al. | |
| 6,083,276 A | 7/2000 | Davidson et al. | |
| 6,084,450 A | 7/2000 | Smith et al. | |
| 6,091,233 A | 7/2000 | Hwang | |
| 6,125,046 A | 9/2000 | Jang et al. | |
| 6,150,774 A | 11/2000 | Mueller et al. | |
| 6,181,114 B1 | 1/2001 | Hemena et al. | |
| 6,188,427 B1 * | 2/2001 | Anderson et al. | 347/255 |
| 6,211,626 B1 | 4/2001 | Lys et al. | |
| 6,211,627 B1 | 4/2001 | Callahan | |
| 6,229,271 B1 | 5/2001 | Liu | |
| 6,229,292 B1 | 5/2001 | Redl et al. | |
| 6,246,183 B1 | 6/2001 | Buonavita | |
| 6,259,614 B1 | 7/2001 | Ribarich et al. | |
| 6,304,066 B1 | 10/2001 | Wilcox et al. | |
| 6,304,473 B1 | 10/2001 | Telefus et al. | |
| 6,343,026 B1 | 1/2002 | Perry | |
| 6,344,811 B1 | 2/2002 | Melanson | |
| 6,369,525 B1 | 4/2002 | Chang et al. | |
| 6,385,063 B1 | 5/2002 | Sadek et al. | |
| 6,407,514 B1 | 6/2002 | Glaser et al. | |
| 6,407,515 B1 | 6/2002 | Hesler | |
| 6,407,691 B1 | 6/2002 | Yu | |
| 6,445,600 B2 | 9/2002 | Ben-Yaakov | |
| 6,452,521 B1 | 9/2002 | Wang | |
| 6,469,484 B2 | 10/2002 | L'Hermite et al. | |
| 6,509,913 B2 | 1/2003 | Martin, Jr. et al. | |
| 6,531,854 B2 | 3/2003 | Hwang | |
| 6,580,258 B2 | 6/2003 | Wilcox et al. | |
| 6,583,550 B2 | 6/2003 | Iwasa et al. | |
| 6,628,106 B1 | 9/2003 | Batarseh et al. | |
| 6,636,003 B2 | 10/2003 | Rahm et al. | |
| 6,646,848 B2 | 11/2003 | Yoshida et al. | |
| 6,657,417 B1 | 12/2003 | Hwang | |
| 6,688,753 B2 | 2/2004 | Calon et al. | |
| 6,713,974 B2 | 3/2004 | Patchornik et al. | |
| 6,724,174 B1 | 4/2004 | Esteves et al. | |
| 6,727,832 B1 | 4/2004 | Melanson | |
| 6,737,845 B2 | 5/2004 | Hwang | |
| 6,741,123 B1 | 5/2004 | Andersen et al. | |
| 6,756,772 B2 | 6/2004 | McGinnis | |
| 6,768,655 B1 | 7/2004 | Yang et al. | |
| 6,781,351 B2 | 8/2004 | Mednik et al. | |
| 6,788,011 B2 | 9/2004 | Mueller et al. | |
| 6,806,659 B1 | 10/2004 | Mueller et al. | |
| 6,839,247 B1 | 1/2005 | Yang | |
| 6,860,628 B2 | 3/2005 | Robertson et al. | |
| 6,870,325 B2 | 3/2005 | Bushell et al. | |
| 6,873,065 B2 | 3/2005 | Haigh et al. | |
| 6,882,552 B2 | 4/2005 | Telefus et al. | |
| 6,888,322 B2 | 5/2005 | Dowling et al. | |
| 6,894,471 B2 | 5/2005 | Corva et al. | |
| 6,933,706 B2 | 8/2005 | Shih | |
| 6,940,733 B2 | 9/2005 | Schie et al. | |
| 6,944,034 B1 | 9/2005 | Shytenberg et al. | |
| 6,956,750 B1 | 10/2005 | Eason et al. | |
| 6,958,920 B2 | 10/2005 | Mednik et al. | |
| 6,963,496 B2 | 11/2005 | Bimbaud | |
| 6,967,448 B2 | 11/2005 | Morgan et al. | |
| 6,970,503 B1 | 11/2005 | Kalb | |
| 6,975,079 B2 | 12/2005 | Lys et al. | |
| 6,975,523 B2 | 12/2005 | Kim et al. | |
| 6,980,446 B2 | 12/2005 | Simada et al. | |
| 7,003,023 B2 | 2/2006 | Krone et al. | |
| 7,034,611 B2 | 4/2006 | Oswal et al. | |
| 7,050,509 B2 | 5/2006 | Krone et al. | |
| 7,064,498 B2 | 6/2006 | Dowling et al. | |
| 7,064,531 B1 | 6/2006 | Zinn | |
| 7,072,191 B2 | 7/2006 | Nakao et al. | |
| 7,075,329 B2 | 7/2006 | Chen et al. | |
| 7,078,963 B1 | 7/2006 | Andersen et al. | |
| 7,088,059 B2 | 8/2006 | McKinney et al. | |
| 7,099,163 B1 | 8/2006 | Ying | |
| 7,102,902 B1 | 9/2006 | Brown et al. | |
| 7,106,603 B1 | 9/2006 | Lin et al. | |
| 7,109,791 B1 | 9/2006 | Epperson et al. | |
| 7,126,288 B2 | 10/2006 | Ribarich et al. | |
| 7,135,824 B2 | 11/2006 | Lys et al. | |
| 7,145,295 B1 | 12/2006 | Lee et al. | |
| 7,158,633 B1 | 1/2007 | Hein | |
| 7,161,816 B2 | 1/2007 | Shytenberg et al. | |
| 7,180,250 B1 | 2/2007 | Gannon | |
| 7,183,957 B1 | 2/2007 | Melanson | |
| 7,221,130 B2 | 5/2007 | Ribeiro et al. | |
| 7,233,135 B2 | 6/2007 | Noma et al. | |
| 7,246,919 B2 | 7/2007 | Porchia et al. | |
| 7,255,457 B2 | 8/2007 | Ducharm et al. | |
| 7,266,001 B1 | 9/2007 | Notohamiprodjo et al. | |
| 7,276,861 B1 | 10/2007 | Shteynberg et al. | |
| 7,288,902 B1 | 10/2007 | Melanson | |
| 7,292,013 B1 | 11/2007 | Chen et al. | |
| 7,310,244 B2 | 12/2007 | Yang et al. | |
| 7,345,458 B2 | 3/2008 | Kanai et al. | |
| 7,375,476 B2 | 5/2008 | Walter et al. | |
| 7,388,764 B2 | 6/2008 | Huynh et al. | |
| 7,394,210 B2 | 7/2008 | Ashdown | |
| 7,459,660 B2 * | 12/2008 | Chan et al. | 250/205 |
| 7,511,437 B2 | 3/2009 | Lys et al. | |
| 7,545,130 B2 | 6/2009 | Latham | |
| 7,583,136 B2 | 9/2009 | Pelly | |
| 7,667,986 B2 | 2/2010 | Artusi et al. | |
| 7,710,047 B2 | 5/2010 | Shteynberg et al. | |
| 7,719,246 B2 | 5/2010 | Melanson | |
| 7,719,248 B1 | 5/2010 | Melanson | |
| 7,746,043 B2 | 6/2010 | Melanson | |
| 7,746,671 B2 | 6/2010 | Radecker et al. | |
| 7,750,738 B2 | 7/2010 | Bach | |
| 7,756,896 B1 | 7/2010 | Feingold | |
| 7,777,563 B2 | 8/2010 | Midya et al. | |
| 7,804,256 B2 | 9/2010 | Melanson | |
| 7,804,480 B2 | 9/2010 | Jeon et al. | |
| 2002/0065583 A1 | 5/2002 | Okada | |
| 2002/0145041 A1 | 10/2002 | Muthu et al. | |
| 2002/0150151 A1 | 10/2002 | Krone et al. | |
| 2002/0166073 A1 | 11/2002 | Nguyen et al. | |
| 2003/0095013 A1 | 5/2003 | Melanson et al. | |
| 2003/0174520 A1 | 9/2003 | Bimbaud | |
| 2003/0223255 A1 | 12/2003 | Ben-Yaakov et al. | |

| | | | |
|---|---|---|---|
| 2004/0004465 A1 | 1/2004 | McGinnis | |
| 2004/0046683 A1 | 3/2004 | Mitamura et al. | |
| 2004/0085030 A1 | 5/2004 | Laflamme et al. | |
| 2004/0085117 A1 | 5/2004 | Melbert et al. | |
| 2004/0169477 A1 | 9/2004 | Yanai et al. | |
| 2004/0227571 A1 | 11/2004 | Kuribayashi | |
| 2004/0228116 A1 | 11/2004 | Miller et al. | |
| 2004/0232971 A1 | 11/2004 | Kawasaki et al. | |
| 2004/0239262 A1 | 12/2004 | Ido et al. | |
| 2005/0057237 A1 | 3/2005 | Clavel | |
| 2005/0156770 A1 | 7/2005 | Melanson | |
| 2005/0168492 A1 | 8/2005 | Hekstra et al. | |
| 2005/0184895 A1 | 8/2005 | Petersen et al. | |
| 2005/0197952 A1 | 9/2005 | Shea et al. | |
| 2005/0218838 A1 | 10/2005 | Lys | |
| 2005/0222881 A1 | 10/2005 | Booker | |
| 2005/0253533 A1 | 11/2005 | Lys et al. | |
| 2005/0275354 A1 | 12/2005 | Hausman, Jr. et al. | |
| 2006/0002110 A1 | 1/2006 | Dowling | |
| 2006/0022916 A1 | 2/2006 | Aiello | |
| 2006/0023002 A1 | 2/2006 | Hara et al. | |
| 2006/0116898 A1 | 6/2006 | Peterson | |
| 2006/0125420 A1 | 6/2006 | Boone et al. | |
| 2006/0184414 A1 | 8/2006 | Pappas et al. | |
| 2006/0214603 A1 | 9/2006 | Oh et al. | |
| 2006/0226795 A1 | 10/2006 | Walter et al. | |
| 2006/0238136 A1 | 10/2006 | Johnson, III et al. | |
| 2006/0261754 A1 | 11/2006 | Lee | |
| 2006/0285365 A1 | 12/2006 | Huynh et al. | |
| 2007/0024213 A1 | 2/2007 | Shteynberg et al. | |
| 2007/0029946 A1 | 2/2007 | Yu et al. | |
| 2007/0040512 A1 | 2/2007 | Jungwirth et al. | |
| 2007/0053182 A1 | 3/2007 | Robertson | |
| 2007/0055564 A1 | 3/2007 | Fourman | |
| 2007/0103949 A1 | 5/2007 | Tsuruya | |
| 2007/0124615 A1 | 5/2007 | Orr | |
| 2007/0126656 A1 | 6/2007 | Huang et al. | |
| 2007/0182699 A1 | 8/2007 | Ha et al. | |
| 2007/0285031 A1 | 12/2007 | Shteynberg et al. | |
| 2008/0012502 A1 | 1/2008 | Lys | |
| 2008/0027841 A1 | 1/2008 | Eder | |
| 2008/0043504 A1 | 2/2008 | Ye et al. | |
| 2008/0054815 A1 | 3/2008 | Kotikalapoodi et al. | |
| 2008/0116818 A1 | 5/2008 | Shteynberg et al. | |
| 2008/0130322 A1 | 6/2008 | Artusi et al. | |
| 2008/0130336 A1 | 6/2008 | Taguchi | |
| 2008/0150433 A1 | 6/2008 | Tsuchida et al. | |
| 2008/0154679 A1 | 6/2008 | Wade | |
| 2008/0174291 A1 | 7/2008 | Hansson et al. | |
| 2008/0174372 A1 | 7/2008 | Tucker et al. | |
| 2008/0175029 A1 | 7/2008 | Jung et al. | |
| 2008/0192509 A1 | 8/2008 | Dhuyvetter et al. | |
| 2008/0224635 A1 | 9/2008 | Hayes | |
| 2008/0232141 A1 | 9/2008 | Artusi et al. | |
| 2008/0239764 A1 | 10/2008 | Jacques et al. | |
| 2008/0259655 A1 | 10/2008 | Wei et al. | |
| 2008/0278132 A1 | 11/2008 | Kesterson et al. | |
| 2009/0067204 A1 | 3/2009 | Ye et al. | |
| 2009/0070188 A1 | 3/2009 | Scott et al. | |
| 2009/0147544 A1 | 6/2009 | Melanson | |
| 2009/0174479 A1 | 7/2009 | Yan et al. | |
| 2010/0141317 A1 | 6/2010 | Szajnowski | |

FOREIGN PATENT DOCUMENTS

| | | |
|---|---|---|
| EP | 0585789 A1 | 3/1994 |
| EP | 0632679 | 1/1995 |
| EP | 0838791 | 4/1998 |
| EP | 0910168 A1 | 4/1999 |
| EP | 1014563 | 6/2000 |
| EP | 1164819 A | 12/2001 |
| EP | 1213823 A2 | 6/2002 |
| EP | 1460775 | 9/2004 |
| EP | 1528785 A | 5/2005 |
| EP | 2204905 A1 | 7/2010 |
| GB | 2069269 A | 8/1981 |
| WO | WO9725836 | 7/1997 |
| WO | 01/15316 A1 | 1/2001 |
| WO | 01/97384 A | 12/2001 |
| WO | 02/15386 A2 | 2/2002 |
| WO | WO0227944 | 4/2002 |
| WO | 02/091805 A2 | 11/2002 |
| WO | WO2006013557 | 2/2006 |
| WO | WO 2006/022107 A2 | 3/2006 |
| WO | 2006/067521 A | 6/2006 |
| WO | WO2006135584 | 12/2006 |
| WO | 2007/026170 A | 3/2007 |
| WO | 2007/079362 A | 7/2007 |
| WO | WO2008072160 | 6/2008 |
| WO | WO2008152838 | 12/2008 |

OTHER PUBLICATIONS

J. Zhou et al., Novel Sampling Algorithm for DSP Controlled 2 kW PFC Converter, IEEE Transactions on Power Electronics, vol. 16, No. 2, Mar. 2001.

A. Prodic, Compensator Design and Stability Assessment for Fast Voltage Loops of Power Factor Correction Rectifiers, IEEE Transactions on Power Electronics, vol. 22, No. 5, Sep. 2007.

M. Brkovic et al., "Automatic Current Shaper with Fast Output Regulation and Soft-Switching," S.15.C Power Converters, Telecommunications Energy Conference, 1993.

Dallas Semiconductor, Maxim, "Charge-Pump and Step-Up DC-DC Converter Solutions for Powering White LEDs in Series or Parallel Connections," Apr. 23, 2002.

Freescale Semiconductor, AN3052, Implementing PFC Average Current Mode Control Using the MC9S12E128, Nov. 2005.

D. Maksimovic et al., "Switching Converters with Wide DC Conversion Range," Institute of Electrical and Electronic Engineer's (IEEE) Transactions on Power Electronics, Jan. 1991.

V. Nguyen et al., "Tracking Control of Buck Converter Using Sliding-Mode with Adaptive Hysteresis," Power Electronics Specialists Conference, 1995. PESC apos; 95 Record., 26th Annual IEEE vol. 2, Issue , Jun. 18-22, 1995 pp. 1086-1093.

S. Zhou et al., "A High Efficiency, Soft Switching DC-DC Converter with Adaptive Current-Ripple Control for Portable Applications," IEEE Transactions on Circuits and Systems—II: Express Briefs, vol. 53, No. 4, Apr. 2006.

K. Leung et al., "Use of State Trajectory Prediction in Hysteresis Control for Achieving Fast Transient Response of the Buck Converter," Circuits and Systems, 2003. ISCAS apos;03. Proceedings of the 2003 International Symposium, vol. 3, Issue , May 25-28, 2003 pp. III-439-III-442 vol. 3.

K. Leung et al., "Dynamic Hysteresis Band Control of the Buck Converter with Fast Transient Response," IEEE Transactions on Circuits and Systems—II: Express Briefs, vol. 52, No. 7, Jul. 2005.

Y. Ohno, Spectral Design Considerations for White LED Color Rendering, Final Manuscript, Optical Engineering, vol. 44, 111302 (2005).

S. Skogstad et al., A Proposed Stability Characterization and Verification Method for High-Order Single-Bit Delta-Sigma Modulators, Norchip Conference, Nov. 2006 http://folk.uio.no/savskogs/pub/A_Proposed_Stability_Characterization.pdf.

J. Turchi, Four Key Steps to Design a Continuous Conduction Mode PFC Stage Using the NCP1653, on Semiconductor, Publication Order No. AND184/D, Nov. 2004.

Megaman, D or S Dimming ESL, Product News, Mar. 15, 2007.

J. Qian et al., New Charge Pump Power-Factor-Correction Electronic Ballast with a Wide Range of Line Input Voltage, IEEE Transactions on Power Electronics, vol. 14, No. 1, Jan. 1999.

P. Green, A Ballast that can be Dimmed from a Domestic (Phase-Cut) Dimmer, IRPLCFL3 rev. b, International Rectifier, http://www.irf.com/technical-info/refdesigns/cfl-3.pdf, printed Mar. 24, 2007.

J. Qian et al., Charge Pump Power-Factor-Correction Technologies Part II: Ballast Applications, IEEE Transactions on Power Electronics, vol. 15, No. 1, Jan. 2000.

Chromacity Shifts in High-Power White LED Systems due to Different Dimming Methods, Solid-State Lighting, http://www.lrc.rpi.edu/programs/solidstate/completedProjects.asp?ID=76, printed May 3, 2007.

S. Chan et al., Design and Implementation of Dimmable Electronic Ballast Based on Integrated Inductor, IEEE Transactions on Power Electronics, vol. 22, No. 1, Jan. 2007.

M. Madigan et al., Integrated High-Quality Rectifier-Regulators, IEEE Transactions on Industrial Electronics, vol. 46, No. 4, Aug. 1999.

T. Wu et al., Single-Stage Electronic Ballast with Dimming Feature and Unity Power Factor, IEEE Transactions on Power Electronics, vol. 13, No. 3, May 1998.

F. Tao et al., "Single-Stage Power-Factor-Correction Electronic Ballast with a Wide Continuous Dimming Control for Fluorescent Lamps," IEEE Power Electronics Specialists Conference, vol. 2, 2001.

Azoteq, IQS17 Family, IQ Switch®—ProxSense™ Series, Touch Sensor, Load Control and User Interface, IQS17 Datasheet V2.00.doc, Jan. 2007.

C. Dilouie, Introducing the LED Driver, EC&M, Sep. 2004.

S. Lee et al., TRIAC Dimmable Ballast with Power Equalization, IEEE Transactions on Power Electronics, vol. 20, No. 6, Nov. 2005.

L. Gonthier et al., EN55015 Compliant 500W Dimmer with Low-Losses Symmetrical Switches, 2005 European Conference on Power Electronics and Applications, Sep. 2005.

Why Different Dimming Ranges? The Difference Between Measured and Perceived Light, 2000 http://www.lutron.com/ballast/pdf/LutronBallastpg3.pdf.

D. Hausman, Real-Time Illumination Stability Systems for Trailing-Edge (Reverse Phase Control) Dimmers, Technical White Paper, Lutron, version 1.0, Dec. 2004, http://www.lutron.com/technical_info/pdf/RTISS-TE.pdf.

Light Dimmer Circuits, www.epanorama.net/documents/lights/lightdimmer.html, printed Mar. 26, 2007.

Light Emitting Diode, http://en.wikipedia.org/wiki/Light-emitting_diode, printed Mar. 27, 2007.

Color Temperature, www.sizes.com/units/color_temperature.htm, printed Mar. 27, 2007.

S. Lee et al., A Novel Electrode Power Profiler for Dimmable Ballasts Using DC Link Voltage and Switching Frequency Controls, IEEE Transactions on Power Electronics, vol. 19, No. 3, May 2004.

Y. Ji et al., Compatibility Testing of Fluorescent Lamp and Ballast Systems, IEEE Transactions on Industry Applications, vol. 35, No. 6, Nov./Dec. 1999.

National Lighting Product Information Program, Specifier Reports, "Dimming Electronic Ballasts," vol. 7, No. 3, Oct. 1999.

Supertex Inc., Buck-based LED Drivers Using the HV9910B, Application Note AN-H48, Dec. 28, 2007.

D. Rand et al., Issues, Models and Solutions for Triac Modulated Phase Dimming of LED Lamps, Power Electronics Specialists Conference, 2007.

Supertex Inc., HV9931 Unity Power Factor LED Lamp Driver, Application Note AN-H52, Mar. 7, 2007.

Supertex Inc., 56W Off-line LED Driver, 120VAC with PFC, 160V, 350mA Load, Dimmer Switch Compatible, DN-H05, Feb. 2007.

ST Microelectronics, Power Factor Corrector L6561, Jun. 2004.

Fairchild Semiconductor, Application Note 42047 Power Factor Correction (PFC) Basics, Rev. 0.9.0 Aug. 19, 2004.

M. Radecker et al., Application of Single-Transistor Smart-Power IC for Fluorescent Lamp Ballast, Thirty-Fourth Annual Industry Applications Conference IEEE, vol. 1, Oct. 3, 1999-Oct. 7, 1999.

M. Rico-Secades et al., Low Cost Electronic Ballast for a 36-W Fluorescent Lamp Based on a Current-Mode-Controlled Boost Inverter for a 120-V DC Bus Power Distribution, IEEE Transactions on Power Electronics, vol. 21, No. 4, Jul. 2006.

Fairchild Semiconductor, FAN4800, Low Start-up Current PFC/PWM Controller Combos, Nov. 2006.

Fairchild Semiconductor, FAN4810, Power Factor Correction Controller, Sep. 24, 2003.

Fairchild Semiconductor, FAN4822, ZVS Average Current PFC Controller, Aug. 10, 2001.

Fairchild Semiconductor, FAN7527B, Power Factor Correction Controller, 2003.

Fairchild Semiconductor, ML4821, Power Factor Controller, Jun. 19, 2001.

Freescale Semiconductor, AN1965, Design of Indirect Power Factor Correction Using 56F800/E, Jul. 2005.

International Search Report for PCT/US2008/051072, mailed Jun. 4, 2008.

Mamano, Bob, "Current Sensing Solutions for Power Supply Designers", Unitrode Seminar Notes SEM1200, 1999.

http://toolbarpdf.com/docs/functions-and-features-of-inverters.html printed on Jan. 20, 2011.

Texas Instruments, Interleaving Continuous Conduction Mode PFC Controller, UCC28070, SLUS794C, Nov. 2007, revised Jun. 2009, Texas Instruments, Dallas TX.

Power Integrations, Inc., "TOP200-4/14 TOPSwitch Family Three-terminal Off-line PWM Switch", XP-002524650, Jul. 1996, Sunnyvale, California.

Texas Instruments, SLOS318F, "High-Speed, Low Noise, Fully-Differential I/O Amplifiers," THS4130 and THS4131, US, Jan. 2006.

International Search Report and Written Opinion, PCT US20080062387, dated Feb. 5, 2008.

International Search Report and Written Opinion, PCT US200900032358, dated Jan. 29, 2009.

Hirota, Atsushi et al, "Analysis of Single Switch Delta-Sigma Modulated Pulse Space Modulation PFC Converter Effectively Using Switching Power Device," IEEE, US, 2002.

Prodic, Aleksandar, "Digital Controller for High-Frequency Rectifiers with Power Factor Correction Suitable for On-Chip Implementation," IEEE, US, 2007.

International Search Report and Written Opinion, PCT US20080062378, dated Feb. 5, 2008.

International Search Report and Written Opinion, PCT US20090032351, dated Jan. 29, 2009.

Erickson, Robert W. et al, "Fundamentals of Power Electronics," Second Edition, Chapter 6, Boulder, CO, 2001.

Allegro Microsystems, A1442, "Low Voltage Full Bridge Brushless DC Motor Driver with Hall Commutation and Soft-Switching, and Reverse Battery, Short Circuit, and Thermal Shutdown Protection," Worcester MA, 2009.

Texas Instruments, SLUS828B, "8-Pin Continuous Conduction Mode (CCM) PFC Controller", UCC28019A, US, revised Apr. 2009.

Analog Devices, "120 kHz Bandwidth, Low Distortion, Isolation Amplifier", AD215, Norwood, MA, 1996.

Burr-Brown, ISO120 and ISO121, "Precision Los Cost Isolation Amplifier," Tucson AZ, Mar. 1992.

Burr-Brown, ISO130, "High IMR, Low Cost Isolation Amplifier," SBOS220, US, Oct. 2001.

International Search Report and Written Report PCT US20080062428 dated Feb. 5, 2008.

Prodic, A. et al, "Dead Zone Digital Controller for Improved Dynamic Response of Power Factor Preregulators," IEEE, 2003.

Linear Technology, "Single Switch PWM Controller with Auxiliary Boost Converter," LT1950 Datasheet, Linear Technology, Inc. Milpitas, CA, 2003.

Yu, Zhenyu, 3.3V DSP for Digital Motor Control, Texas Instruments, Application Report SPRA550 dated Jun. 1999.

International Rectifier, Data Sheet No. PD60143-O, Current Sensing Single Channel Driver, El Segundo, CA, dated Sep. 8, 2004.

Balogh, Laszlo, "Design and Application Guide for High Speed MOSFET Gate Drive Circuits" [Online] 2001, Texas Instruments, Inc., SEM-1400, Unitrode Power Supply Design Seminar, Topic II, TI literature No. SLUP133, XP002552367, Retrieved from the Internet: URL:htt://focus.ti.com/lit/ml/slup169/slup169.pdf the whole document.

International Search Report for PCT/US2010/031978, dated Feb. 21, 2011.

D. Hausman, Lutron, RTISS-TE Operation, Real-Time Illumination Stability Systems for Trailing-Edge (Reverse Phase Control) Dimmers, v. 1.0 Dec. 2004.

International Rectifier, Data Sheet No. PD60230 revC, IR1150(S)(PbF), uPFC One Cycle Control PFC IC Feb. 5, 2007.

Texas Instruments, Application Report SLUA308, UCC3817 Current Sense Transformer Evaluation, Feb. 2004.

Texas Instruments, Application Report SPRA902A, Average Current Mode Controlled Power Factor Correctiom Converter using TMS320LF2407A, Jul. 2005.

Unitrode, Design Note DN-39E, Optimizing Performance in UC3854 Power Factor Correction Applications, Nov. 1994.

Fairchild Semiconductor, Application Note 42030, Theory and Application of the ML4821 Average Currrent Mode PFC Controller, Aug. 1997.
Fairchild Semiconductor, Application Note AN4121, Design of Power Factor Correction Circuit Using FAN7527B, Rev.1.0.1, May 30, 2002.
Fairchild Semiconductor, Application Note 6004, 500W Power-Factor-Corrected (PFC) Converter Design with FAN4810, Rev. 1.0.1, Oct. 31, 2003.
Fairchild Semiconductor, FAN4822, ZVA Average Current PFC Controller, Rev. 1.0.1 Aug. 10, 2001.
Fairchild Semiconductor, ML4821, Power Factor Controller, Rev. 1.0.2, Jun. 19, 2001.
Fairchild Semiconductor, ML4812, Power Factor Controller, Rev. 1.0.4, May 31, 2001.
Linear Technology, 100 Watt LED Driver, Linear Technology, 2006.
Fairchild Semiconductor, FAN7544, Simple Ballast Controller, Rev. 1.0.0, 2004.
Fairchild Semiconductor, FAN7532, Ballast Controller, Rev. 1.0.2, Jun. 2006.
Fairchild Semiconductor, FAN7711, Ballast Control IC, Rev. 1.0.2, Mar. 2007.
Fairchild Semiconductor, KA7541, Simple Ballast Controller, Rev. 1.0.3, 2001.
ST Microelectronics, L6574, CFL/TL Ballast Driver Preheat and Dimming, Sep. 2003.
ST Microelectronics, AN993, Application Note, Electronic Ballast with PFC Using L6574 and L6561, May 2004.
International Search Report and Written Opinion for PCT/US2008/062384 dated Jan. 14, 2008.
S. Dunlap et al., Design of Delta-Sigma Modulated Switching Power Supply, Circuits & Systems, Proceedings of the 1998 IEEE International Symposium, 1998.
Infineon, CCM-PFC Standalone Power Factor Correction (PFC) Controller in Continuous Conduction Mode (CCM), Version 2.1, Feb. 6, 2007.
International Rectifier, IRAC1150-300W Demo Board, User's Guide, Rev 3.0, Aug. 2, 2005.
International Rectifier, Application Note AN-1077,PFC Converter Design with IR1150 One Cycle Control IC, rev. 2.3, Jun. 2005.
International Rectifier, Data Sheet PD60230 revC, Feb. 5, 2007.
Lu et al., International Rectifier, Bridgeless PFC Implementation Using One Cycle Control Technique, 2005.
Linear Technology, LT1248, Power Factor Controller, Apr. 20, 2007.
On Semiconductor, AND8123/D, Power Factor Correction Stages Operating in Critical Conduction Mode, Sep. 2003.
On Semiconductor, MC33260, GreenLine Compact Power Factor Controller: Innovative Circuit for Cost Effective Solutions, Sep. 2005.
On Semiconductor, NCP1605, Enhanced, High Voltage and Efficient Standby Mode, Power Factor Controller, Feb. 2007.
On Semconductor, NCP1606, Cost Effective Power Factor Controller, Mar. 2007.
On Semiconductor, NCP1654, Product Review, Power Factor Controller for Compact and Robust, Continuous Conduction Mode Pre-Converters, Mar. 2007.
Philips, Application Note, 90W Resonant SMPS with TEA1610 SwingChip, AN99011, 1999.
NXP, TEA1750, GreenChip III SMPS control IC Product Data Sheet, Apr. 6, 2007.
Renesas, HA16174P/FP, Power Factor Correction Controller IC, Jan. 6, 2006.
Renesas Technology Releases Industry's First Critical-Conduction-Mode Power Factor Correction Control IC Implementing Interleaved Operation, Dec. 18, 2006.
Renesas, Application Note R2A20111 EVB, PFC Control IC R2A20111 Evaluation Board, Feb. 2007.
STMicroelectronics, L6563, Advanced Transition-Mode PFC Controller, Mar. 2007.
Texas Instruments, Application Note SLUA321, Startup Current Transient of the Leading Edge Triggered PFC Controllers, Jul. 2004.

Texas Instruments, Application Report, SLUA309A, Avoiding Audible Noise at Light Loads when using Leading Edge Triggered PFC Converters, Sep. 2004.
Texas Instruments, Application Report SLUA369B, 350-W, Two-Phase Interleaved PFC Pre-Regulator Design Review, Mar. 2007.
UNITRODE, High Power-Factor Preregulator, Oct. 1994.
Texas Instruments, Transition Mode PFC Controller, SLUS515D, Jul. 2005.
Unitrode Products From Texas Instruments, Programmable Output Power Factor Preregulator, Dec. 2004.
Unitrode Products From Texas Instruments, High Performance Power Factor Preregulator, Oct. 2005.
Texas Instruments, UCC3817 BiCMOS Power Factor Preregulator Evaluation Board User's Guide, Nov. 2002.
Unitrode, L. Balogh, Design Note UC3854A/B and UC3855A/B Provide Power Limiting with Sinusoidal Input Current for PFC Front Ends, SLUA196A, Nov. 2001.
A. Silva De Morais et al., A High Power Factor Ballast Using a Single Switch with Both Power Stages Integrated, IEEE Transactions on Power Electronics, vol. 21, No. 2, Mar. 2006.
M. Ponce et al., High-Efficient Integrated Electronic Ballast for Compact Fluorescent Lamps, IEEE Transactions on Power Electronics, vol. 21, No. 2, Mar. 2006.
A.R. Seidel et al., A Practical Comparison Among High-Power-Factor Electronic Ballasts with Similar Ideas, IEEE Transactions on Industry Applications, vol. 41, No. 6, Nov.-Dec. 2005.
F. T. Wakabayashi et al., An Improved Design Procedure for LCC Resonant Filter of Dimmable Electronic Ballasts for Fluorescent Lamps, Based on Lamp Model, IEEE Transactions on Power Electronics, vol. 20, No. 2, Sep. 2005.
J. A. Vilela Jr. et al., An Electronic Ballast with High Power Factor and Low Voltage Stress, IEEE Transactions on Industry Applications, vol. 41, No. 4, Jul./Aug. 2005.
S. T.S. Lee et al., Use of Saturable Inductor to Improve the Dimming Characteristics of Frequency-Controlled Dimmable Electronic Ballasts, IEEE Transactions on Power Electronics, vol. 19, No. 6, Nov. 2004.
M. K. Kazimierczuk et al., Electronic Ballast for Fluorescent Lamps, IEEETransactions on Power Electronics, vol. 8, No. 4, Oct. 1993.
S. Ben-Yaakov et al., Statics and Dynamics of Fluorescent Lamps Operating at High Frequency: Modeling and Simulation, IEEE Transactions on Industry Applications, vol. 38, No. 6, Nov.-Dec. 2002.
H. L. Cheng et al., A Novel Single-Stage High-Power-Factor Electronic Ballast with Symmetrical Topology, IEEE Transactions on Power Electronics, vol. 50, No. 4, Aug. 2003.
J.W.F. Dorleijn et al., Standardisation of the Static Resistances of Fluorescent Lamp Cathodes and New Data for Preheating, Industry Applications Conference, vol. 1, Oct. 13, 2002-Oct. 18, 2002.
Q. Li et al., An Analysis of the ZVS Two-Inductor Boost Converter under Variable Frequency Operation, IEEE Transactions on Power Electronics, vol. 22, No. 1, Jan. 2007.
H. Peng et al., Modeling of Quantization Effects in Digitally Controlled DC-DC Converters, IEEE Transactions on Power Electronics, vol. 22, No. 1, Jan. 2007.
G.Yao et al., Soft Switching Circuit for Interleaved Boost Converters, IEEE Transactions on Power Electronics, vol. 22, No. 1, Jan. 2007.
C.M. De Oliviera Stein et al., A ZCT Auxiliary Communication Circuit for Interleaved Boost Converters Operating in Critical Conduction Mode, IEEE Transactions on Power Electronics, vol. 17, No. 6, Nov. 2002.
W. Zhang et al., A New Duty Cycle Control Strategy for Power Factor Correction and FPGA Implementation, IEEE Transactions on Power Electronics, vol. 21, No. 6, Nov. 2006.
H. Wu et al., Single Phase Three-Level Power Factor Correction Circuit with Passive Lossless Snubber, IEEE Transactions on Power Electronics, vol. 17, No. 2, Mar. 2006.
O. Garcia et al., High Efficiency PFC Converter to Meet EN61000-3-2 and A14, Proceedings of the 2002 IEEE International Symposium on Industrial Electronics, vol. 3, 2002.
P. Lee et al., Steady-State Analysis of an Interleaved Boost Converter with Coupled Inductors, IEEE Transactions on Industrial Electronics, vol. 47, No. 4, Aug. 2000.

D.K.W. Cheng et al., A New Improved Boost Converter with Ripple Free Input Current Using Coupled Inductors, Power Electronics and Variable Speed Drives, Sep. 21-23, 1998.

B.A. Miwa et al., High Efficiency Power Factor Correction Using Interleaved Techniques, Applied Power Electronics Conference and Exposition, Seventh Annual Conference Proceedings, Feb. 23-27, 1992.

Z. Lai et al., A Family of Power-Factor-Correction Controllers, Twelfth Annual Applied Power Electronics Conference and Exposition, vol. 1, Feb. 23, 1997-Feb. 27, 1997.

L. Balogh et al., Power-Factor Correction with Interleaved Boost Converters in Continuous-Inductor-Current Mode, Eighth Annual Applied Power Electronics Conference and Exposition, 1993. APEC '93. Conference Proceedings, Mar. 7, 1993-Mar. 11, 1993.

Fairchild Semiconductor, Application Note 42030, Theory and Application of the ML4821 Average Current Mode PFC Controller, Oct. 25, 2000.

Unitrode Products From Texas Instruments, BiCMOS Power Factor Preregulator, Feb. 2006.

International Preliminary Report on Patentability and Written Opinion for PCT/US2010/031978, dated Nov. 10, 2011.

"HV9931 Unity Power Factor LED Lamp Driver, Initial Release" 2005, Supertex Inc., Sunnyvale, CA USA.

"AN-H52 Application Note: HV9931 Unity Power Factor LED Lamp Driver" Mar. 7, 2007, Supertex Inc., Sunnyvale, CA, USA.

Dustin Rand et al: "Issues, Models and Solutions for Triac Modulated Phase Dimming of LED Lamps" Power Electronics Specialists Conference, 2007. PESC 2007, IEEE, IEEE, P1, Jun. 1, 2007, pp. 1398-1404.

Spiazzi G et al: "Analysis of a High-Power-Factor Electronic Ballast for High Brightness Light Emitting Diodes" Power Electronics Specialists, 2005 IEEE 36th Conference on June 12, 2005, Piscatawa, NJ USA, IEEE, Jun. 12, 2005, pp. 1494-1499.

International Search Report PCT/US2008/062381 dated Feb. 5, 2008.

International Search Report PCT/US2008/056739 dated Dec. 3, 2008.

Written Opinion of the International Searching Authority PCT/US2008/062381 dated Feb. 5, 2008.

Ben-Yaakov et al, "The Dynamics of a PWM Boost Converter with Resistive Input" IEEE Transactions on Industrial Electronics, IEEE Service Center, Piscataway, NJ, USA, vol. 46, No. 3, Jun. 1, 1999.

International Search Report PCT/US2008/062398 dated Feb. 5, 2008.

Partial International Search PCT/US2008/062387 dated Feb. 5, 2008.

Noon, Jim "UC3855A/B High Performance Power Factor Preregulator", Texas Instruments, SLUA146A, May 1996, Revised Apr. 2004.

"High Performance Power Factor Preregulator", Unitrode Products from Texas Instruments, SLUS382B, Jun. 1998, Revised Oct. 2005.

International Search Report PCT/GB2006/003259 dated Jan. 12, 2007.

Written Opinion of the International Searching Authority PCT/US2008/056739, Dec. 3, 2008.

International Search Report PCT/US2008/056606 dated Dec. 3, 2008.

Written Opinion of the International Searching Authority PCT/US2008/056606 dated Dec. 3, 2008.

International Search Report PCT/US2008/056608 dated Dec. 3, 2008.

Written Opinion of the International Searching Authority PCT/US2008/056608 dated Dec. 3, 2008.

International Search Report PCT/GB2005/050228 dated Mar. 14, 2006.

International Search PCT/US2008/062387 dated Jan. 10, 2008.

Data Sheet LT3496 Triple Output LED Driver, 2007, Linear Technology Corporation, Milpitas, CA.

News Release, Triple Output LED, LT3496, May 24, 2007.

* cited by examiner

CALIBRATION OF LAMPS

BACKGROUND OF THE INVENTION

1. Field of the Invention

The present invention relates in general to the field of signal processing, and more specifically to a system and method of calibrating lamps.

2. Description of the Related Art

Light emitting diodes (LEDs) are becoming particularly attractive as main stream light sources in part because of energy savings through high efficiency light output and environmental incentives such as the reduction of mercury. LEDs are semiconductor devices and are driven by direct current. The brightness (i.e. luminous intensity) of the LED approximately varies in direct proportion to the current flowing through the LED. Thus, increasing current supplied to an LED increases the intensity of the LED and decreasing current supplied to the LED dims the LED. Current can be modified by either directly reducing the direct current level to the white LEDs or by reducing the average current through duty cycle modulation.

LEDs have component-to-component variation. For example, for a particular current, the brightness of one LED compared to another LED can vary by an amount that is noticeable by a human. Additionally, when one or more LEDs are assembled into a lamp and multiple lamps are arranged in proximity to each other, the variation between LEDs in different lamps can be sufficient to allow a human to notice a difference in the brightness of one lamp to another.

FIG. 1A depicts a lamp calibration system 100. In general, lamp calibration system 100 allows the brightness of lamp 102 to be tested and, if desired, adjusted within a tolerance level. The tolerance level can be a specific value or a range of values. The lamp calibration system 100 includes a lamp 102 situated in proximity to a light meter 104. The lamp 102 connects via exemplary power terminals 106 and 108 to voltage source 110 that supplies an alternating current (AC) supply voltage $V_{AC\_SUPPLY}$ to lamp 102. Each lamp 102 is calibrated so that the brightness of lamp 102 is within a predetermined brightness tolerance. The voltage source 110 is, for example, a public utility, and the AC supply voltage $V_{AC\_SUPPLY}$ is, for example, a 60 Hz/110 V line voltage in the United States of America or a 50 Hz/220 V line voltage in Europe. Lamp 102 includes a power control circuit 112 that converts the supply voltage $V_{AC\_SUPPLY}$ into a regulated link voltage $V_{LINK}$ and an output current $i_{OUT}$. The link voltage is, for example, an approximately constant voltage having a regulated value between 200V and 400V. The power control circuit 112 includes a lamp driver 114. The lamp driver 114 is a switching power converter, such as a buck converter, boost converter, or a buck-boost converter. Lamp driver 114 includes a switch (not shown), and a duty cycle of the switch is controlled by a switch control signal $CS_0$ generated by controller 116. An exemplary power control circuit is described with reference to FIGS. 1 and 2 of U.S. patent application Ser. No. 11/967,269, entitled Power Control System Using A Nonlinear Delta-Sigma Modulator With Nonlinear Power Conversion Process Modeling, filed on Dec. 31, 2007, inventor John L. Melanson, and assignee Cirrus Logic, Inc. U.S. patent application Ser. No. 11/967,269 is referred to herein as "Melanson I" and is hereby incorporated herein in its entirety.

FIG. 1B depicts lamp calibration system 150, which represents a physical embodiment of lamp calibration system 100. Lamp 124 represents an exemplary physical embodiment of lamp 102. To calibrate lamp 124, lamp 124 is physically placed in a test apparatus 126 and connected to voltage source 110. Power control circuit supplies the output current $i_{OUT}$ to light source 118 to cause each of one or more LEDs in light source 118 to illuminate. Light meter 104 detects the light 119 generated by light source 118 and displays an indication of the brightness of light source 118 on display 120. Power control circuit 112 includes a trim module 122 that can be adjusted to vary the brightness of lamp 124 so that the brightness of lamp 102 as indicated by light meter 104 is within the predetermined brightness tolerance.

Power control circuit 112 is connected to housing 128 via power wires 132 of lamp 124. To expose the trim module 122, lamp 124 is partially disassembled by disconnecting housing 128 from lamp cover 130. Exposing the trim module 122 allows access to the trim module 122 and allows adjustment of the trim module 122 to adjust the brightness of lamp 124. After adjustment, lamp 124 is reassembled.

Partially disassembling lamp 124, adjusting the trim module 122, and reassembling lamp 124 results in a time consuming calibration process that is generally not conducive to manufacturing lamps in commercial volumes at competitive prices. Additionally, some conventional lamps 102 have inaccessible power control circuits and, thus, are not calibrated. Thus, it is desirable to have a different manner of calibrating a lamp.

SUMMARY OF THE INVENTION

In one embodiment of the present invention, an apparatus includes a controller configured to generate one or more power control signals for a lamp, wherein the controller is further configured to receive lamp calibration data received via one or more power terminals of the lamp and to process the calibration data to calibrate the lamp.

In another embodiment of the present invention, a method includes receiving lamp calibration data via one or more power terminals of a lamp and processing the lamp calibration data to calibrate the lamp. The method further includes generating one or more power control signals for the lamp using the calibration data.

In a further embodiment of the present invention, an apparatus includes calibration unit configured to send calibration data for calibrating a lamp to one or more power terminals of a lamp.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In at least one embodiment, a lamp includes a controller configured to generate power control signals for a lamp is also configured to receive lamp calibration data received via one or more power terminals of the lamp. The controller is configured to process the calibration data to calibrate the lamp. A calibration system energizes the lamp to allow a light meter to measure the light emitted from the lamp under normal operating conditions. In at least one embodiment, the lamp includes one or more light emitting diodes (LEDs) that emit the light. The light meter provides light data to the calibration unit. The light data measures one or more properties of the light such as brightness and dominant optical wavelength. The calibration unit determines whether the light data indicates that the lamp is within tolerances.

The lamp receives power from a voltage source via power terminals. The calibration unit generates calibration data for the controller and modulates the voltage supplied to the lamp to send the calibration data to the controller. Thus, in at least one embodiment, the lamp receives the calibration data via the power terminals. The controller includes a decoder that decodes the calibration data. In at least one embodiment, the controller includes a processor to process the calibration data to calibrate the lamp.

In at least one embodiment, the voltage supplied to the lamp during calibration is an AC supply voltage. The calibration unit modulates the AC supply voltage to encode the calibration data in the supply voltage so that the supply voltage is converted into a supply voltage and data signal. In at least one embodiment, the calibration unit modulates the supply voltage by using phase modulation and encodes the calibration data in the resulting phase angles. In at least one embodiment, the controller already includes a timer to detect phase angles associated with dimming of the lamp during normal use. The output of the timer can be used to decode the calibration data.

In at least one embodiment, the voltage to the lamp during calibration is a high speed, pulse width modulated (PWM) supply voltage signal. The duty cycle of the PWM signal is modified to encode the calibration data. The peak voltage of the PWM signal is adjusted in accordance with the pulse width modulation so that an average peak value of the supply voltage signal provides the voltage level used to turn the lamp "ON".

Figure 1A:
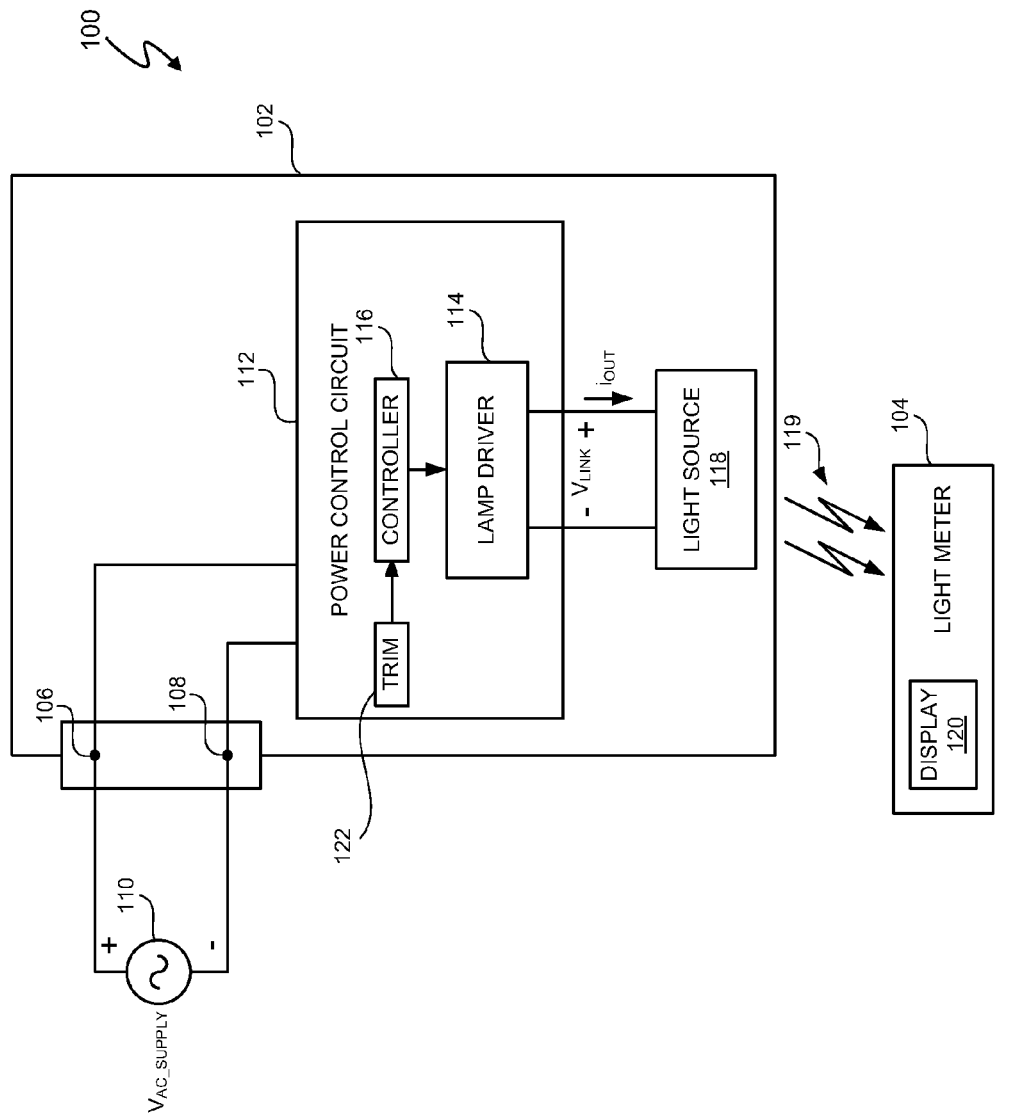
FIG. 1A (labeled prior art) depicts a lamp calibration system.
Figure 1B:
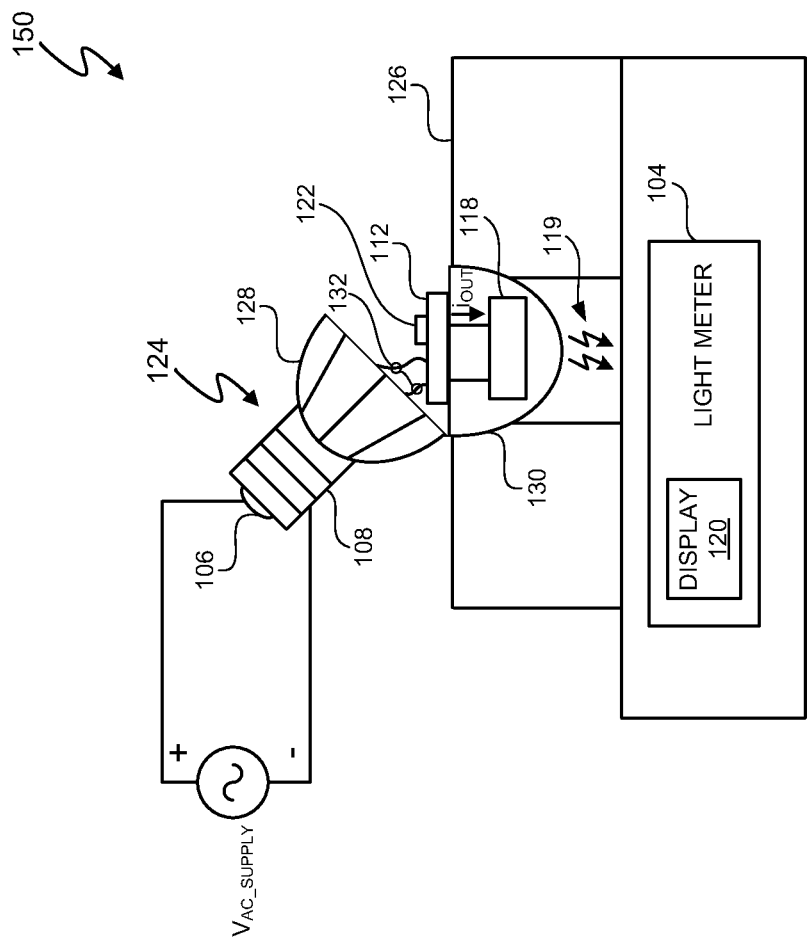
FIG. 1B (labeled prior art) depicts an embodiment of the lamp calibration system of FIG. 1A.
Figure 2:
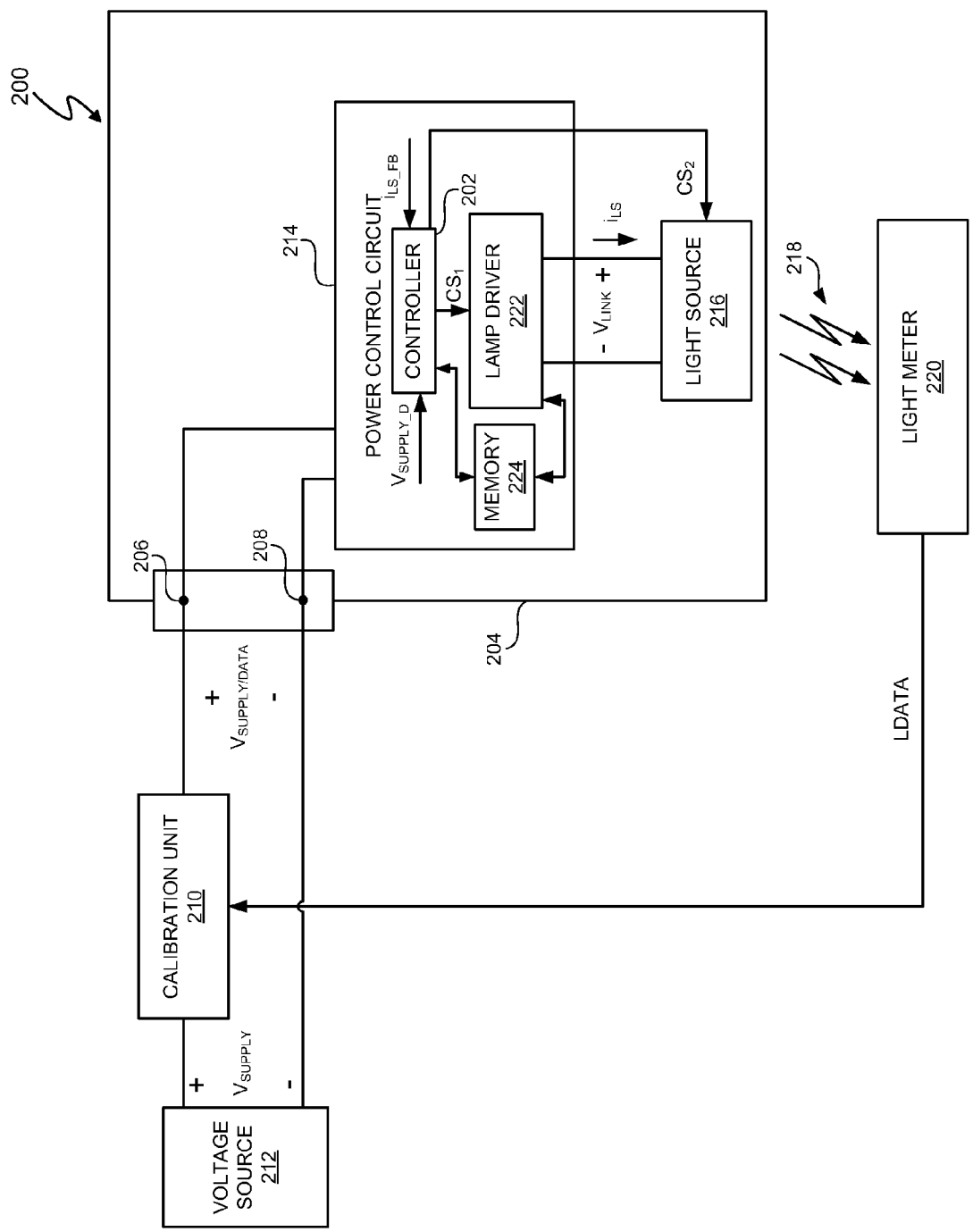
FIG. 2 depicts a lamp calibration system.

FIG. 2 depicts a lamp calibration system 200 that includes a controller 202 configured to generate power control signals $CS_1$ and $CS_2$ for lamp 204 and to receive lamp supply voltage/calibration data $V_{SUPPLY/DATA}$. In general, lamp calibration system 200 allows one or more properties of lamp 102 to be tested and, if desired, adjusted to a tolerance level. The tolerance level can be a specific value or a range of values. In at least one embodiment, controller 202 is an integrated circuit fabricated on a semiconductor wafer. In other embodiments, controller 202 is fabricated using discrete components or a combination of integrated and discrete components. Controller 202 can be analog, digital, or mixed analog and digital. Although two control signals $CS_1$ and $CS_2$ are depicted, controller 202 can be configured to generate any number of control signals to control the link voltage $V_{LINK}$ and the current or currents in light source 216. In at least one embodiment, multiple currents flow in light source 216 to respectively illuminate separate sets of light emitting sources, such as LEDs.

During calibration of lamp 204, the power terminals 206 and 208 of lamp 204 are respectively connected to calibration unit 210 and voltage source 212. Voltage source 212 provides a supply voltage $V_{SUPPLY}$. The supply voltage $V_{SUPPLY}$ can be an alternating current (AC) or a direct current (DC) voltage. During calibration of lamp 204, power control circuit 214 generates a link voltage $V_{LINK}$ and supplies power to light source 216. In at least one embodiment, control signal $CS_1$ controls the link voltage $V_{LINK}$. Power control unit 214 also supplies an output current $i_{LS}$ to light source 216 to cause light source 216 to emit light 218. In at least one embodiment, control signal $CS_2$ controls an average value of the output current $i_{LS}$. In at least one embodiment, power control unit 214 controls a switch (such as switch 1522 in FIG. 15) in light source 216 that directly controls the output current $i_{LS}$ in light source 216. Light source 216 can be any type of light source. In at least one embodiment, light source 216 includes one or more sets of one or more LEDs.

Light meter 220 detects the light emitted from light source 216 and generates a lighting data signal LDATA. The lighting data signal LDATA contains data representing the property(ies) of the light 218 as determined by light meter 220. In at least one embodiment, the lighting data signal LDATA contains data representing the brightness of light source 216. The light meter 220 provides the lighting data signal LDATA to calibration unit 210. The calibration unit 210 processes the lighting data signal LDATA and determines whether each property of the light 218, as reported by the lighting data signal LDATA, is within a predetermined tolerance. If the lamp 204 emits light 218 within tolerance, calibration unit 210 provides an indication that lamp 204 is ready for use. The "ready for use" indication can be a visual cue or an electronic signal provided to an automated test apparatus (FIG. 3), which then removes the lamp 204 and replaces lamp 204 with another lamp for calibration. If the light 218 is not within tolerance, calibration unit 210 determines calibration data to be sent to lamp 204. The calibration data notifies controller 202 of changes to be made by lamp 204 that will bring lamp 204 into within a tolerance level or at least closer to a tolerance level.

Calibration unit 210 sends the calibration data to controller 202 by modulating the supply voltage $V_{SUPPLY}$ to generate supply voltage/calibration data $V_{SUPPLY/DATA}$. Data signal $V_{SUPPLY\_D}$ represents the data encoded in supply voltage/calibration data $V_{SUPPLY/DATA}$. In at least one embodiment, data signal $V_{SUPPLY\_D}$ is a direct one-to-one observation of supply voltage/calibration data $V_{SUPPLY/DATA}$. In another embodiment, data signal $V_{SUPPLY\_D}$ is observed across a sampling resistor (not shown) to generate a scaled version of supply voltage/calibration data $V_{SUPPLY/DATA}$. In at least one embodiment, calibration unit 210 also sends header data to the controller 202 to cause controller 202 to enter a calibration mode. In at least one embodiment, the header data is a sequence of bits that alerts the controller 202 that supply voltage/calibration data $V_{SUPPLY/DATA}$ includes calibration data to be decoded. The supply voltage/calibration data $V_{SUPPLY/DATA}$ is received by the lamp 204 via power terminals 206 and 208. Calibration unit 210 can utilize any modulation technique, such as phase angle modulation and pulse width modulation, to encode the supply voltage/calibration data $V_{SUPPLY/DATA}$ with the calibration data. In at least one embodiment, during normal use, e.g. not during calibration mode, controller 202 is configured to cause lamp driver 222 to dim light source 216 by detecting phase angles of a phase modulated supply voltage. Thus, in at least one embodiment, calibration unit 210 can encode the calibration data in the supply voltage/calibration data $V_{SUPPLY/DATA}$ by phase modulating the supply voltage $V_{SUPPLY}$ during the calibration mode, and controller 202 can utilize the same components used to detect the phase angles for dimming to decode the calibration data from the phase modulated supply voltage/calibration data $V_{SUPPLY/DATA}$ during a normal mode of use.

However, in at least one embodiment, phase modulating the supply voltage $V_{SUPPLY}$ to encode the calibration data in supply voltage/calibration data $V_{SUPPLY/DATA}$ limits the data transfer rate to lamp 204 to a multiple between 1 and 4 of the frequency $f_{VSUPPLY}$ of the supply voltage $V_{SUPPLY}$. For example, identically phase modulating each half cycle of the supply voltage $V_{SUPPLY}$ results in a data transfer rate of $f_{VSUPPLY}$. Independently phase modulating the leading edge or trailing edge of each half cycle of the supply voltage $V_{SUPPLY}$ results in a data transfer rate of $2f_{VSUPPLY}$. Independently phase modulating the leading and trailing edges of each half cycle of the supply voltage $V_{SUPPLY}$ results in a data transfer rate of $4f_{VSUPPLY}$. In the U.S., the value of frequency $f_{VSUPPLY}$ is 60 Hz, and in Europe the value of frequency $f_{VSUPPLY}$ is 50 Hz. Thus, in at least one embodiment, the maximum transfer rate is 240 Hz in the U.S. and 200 Hz in Europe.

In another embodiment, calibration unit 210 increases the data transfer rate of the calibration data by modulating a DC supply voltage $V_{SUPPLY}$ supplied by voltage source 212. In at least one embodiment, calibration unit 210 utilizes pulse width modulation to vary the duty cycle of supply voltage $V_{SUPPLY}$. The value of the duty cycle encodes the calibration data. To decode the calibration data, in at least one embodiment, controller 202 includes a decoder, such as decoder 1200 (FIG. 12), to detect each duty cycle of supply voltage/calibration data $V_{SUPPLY/DATA}$ and to recover the calibration data from the supply voltage/calibration data $V_{SUPPLY/DATA}$. Since the supply voltage/calibration data $V_{SUPPLY/DATA}$ also supplies operating voltage to lamp 204, calibration unit 210 adjusts the peak voltage of the pulse width modulated supply voltage/calibration data $V_{SUPPLY/DATA}$ so that an average peak voltage of supply voltage/calibration data $V_{SUPPLY/DATA}$ provides sufficient operating voltage to lamp 204. The data transfer rate of calibration data can be set at any value supported by calibration unit 210 and controller 202. For example, the data transfer rate can be set within a range of 1 kHz to 10 kHz.

In at least one embodiment, controller 202 stores the calibration data or data derived from the calibration data in memory 224. Memory 224 can be separate from controller 202 as depicted in FIG. 2 or incorporated into controller 202. In at least one embodiment, memory 224 includes both volatile and nonvolatile storage devices.

During the normal mode of use and in calibration mode, the controller 202 retrieves the stored calibration data from memory 224 and uses the calibration data to adjust the light 218 to within a tolerance level. The particular tolerance level is, for example, dependent upon the particular light source 216 and manufacturer specifications for the light source 216.

For example, for a multiple LED light 218, an example tolerance level is 600 lumens +/−10%, i.e. between 540 to 660 lumens. The manner in which controller 202 utilizes the calibration data to adjust the light 218 to within a tolerance level is a matter of design choice. For example, in at least one embodiment, the controller 202 receives a light source current feedback signal $i_{LS\_FB}$ representing the current in light source 216. In at least one embodiment, controller 202 utilizes the calibration data as a target value to compare against the light source current feedback signal $i_{LS\_FB}$. The controller 202 then adjusts the control signal $CS_1$ so that lamp driver 222 drives the light source current feedback signal $i_{LS\_FB}$ towards the target value indicated by the calibration data. In another embodiment, controller 202 utilizes the calibration data to modify the light source current feedback signal $i_{LS\_FB}$ prior to comparison to a target value and then adjusts the control signal $CS_1$ so that lamp driver 222 drives the light source current feedback signal towards the target value. Because calibration of the lamp 204 does not require physical access to the power control circuit 214, lamp 204 can be calibrated while fully assembled.

In at least one embodiment, the lamp 204 is configured to send information to another device, such as calibration unit 210 or any other device that can receive and decode data. In at least one embodiment, the information is related to lamp 204, such as an internal temperature of lamp 204, the value of calibration data stored in memory 204 (such as calibration data CAL_DATA in FIG. 13), the serial number of lamp 204, hours of use, and/or date of manufacture. In at least one embodiment, lamp 204 sends data by pulsing light source 216. The pulses of light 218 represent information. In at least one embodiment, lamp 204 responds to a request by calibration unit 210 to send specific information. For example, in one embodiment, calibration unit 210 is configured to request information from lamp 204, such as the internal temperature of lamp 204, the value of calibration data stored in memory 204 (such as calibration data CAL_DATA in FIG. 13), or any other data that is, for example, determined by lamp 204 or stored in memory 224. In at least one embodiment, controller 202 is configured to encode the data as pulses of light 218. Light meter 220 detects the pulses of light 218 and sends lighting data signal LDATA. The value of lighting data signal LDATA represents the pulses of light 218. Calibration unit 210 decodes the lighting data signal LDATA to obtain the requested information.

In at least one embodiment, lamp 204 pulses light 218 without receiving a request, such as in response to internal programming of controller 202. Light 218 can be pulsed by, for example, turning the light source 216 "on" and "off" or by varying the intensity of light 218. In at least one embodiment, when pulsing light 218 without receiving a request, the pulses of light 218 represents a packet of data that informs the data recipient, such as calibration unit 210, of, for example, that data is being sent, the type of data, and the value of the information of interest represented by the data.

For example, calibration unit 210 encodes supply voltage/calibration data $V_{SUPPLY/DATA}$ with a request that lamp 204 provide the calibration data CAL_DATA stored in memory 224. Controller 202 decodes the request, retrieves the value of the calibration data CAL_DATA from memory 224, commands lamp driver 222 to cause light source 216 to pulse light 218 in accordance with a response packet of data. The response packet includes the data responsive to the request of calibration unit 210 and can include other data to allow calibration 210 to identify and verify the response. For example, in one embodiment, the response packet contains three blocks of data respectively consisting of a key sequence to identify the response, the responsive data, and verification data. Thus, in one embodiment, if the calibration unit 210 requests the value of calibration data CAL_DATA stored in memory 224, the key sequence is 110110111, the calibration data CAL_DATA has a binary value of "10011", and a summation of the key sequence and the calibration data CAL_DATA (referred to as a "checksum") has a binary value of 111001010. Lamp 204 responds to the request by pulsing light 218 with a sequence 110110111100111111001010. In at least one embodiment, each pulse has a predetermined duration known to both the controller 202 and calibration unit 210, and pulses representing a binary "0" have a different brightness than pulses representing a binary "1". The length of data in the response packet, the configuration of the packet, the coding of data in the packet, and any other parameter related to the packet are matters of design choice.

Figure 3:
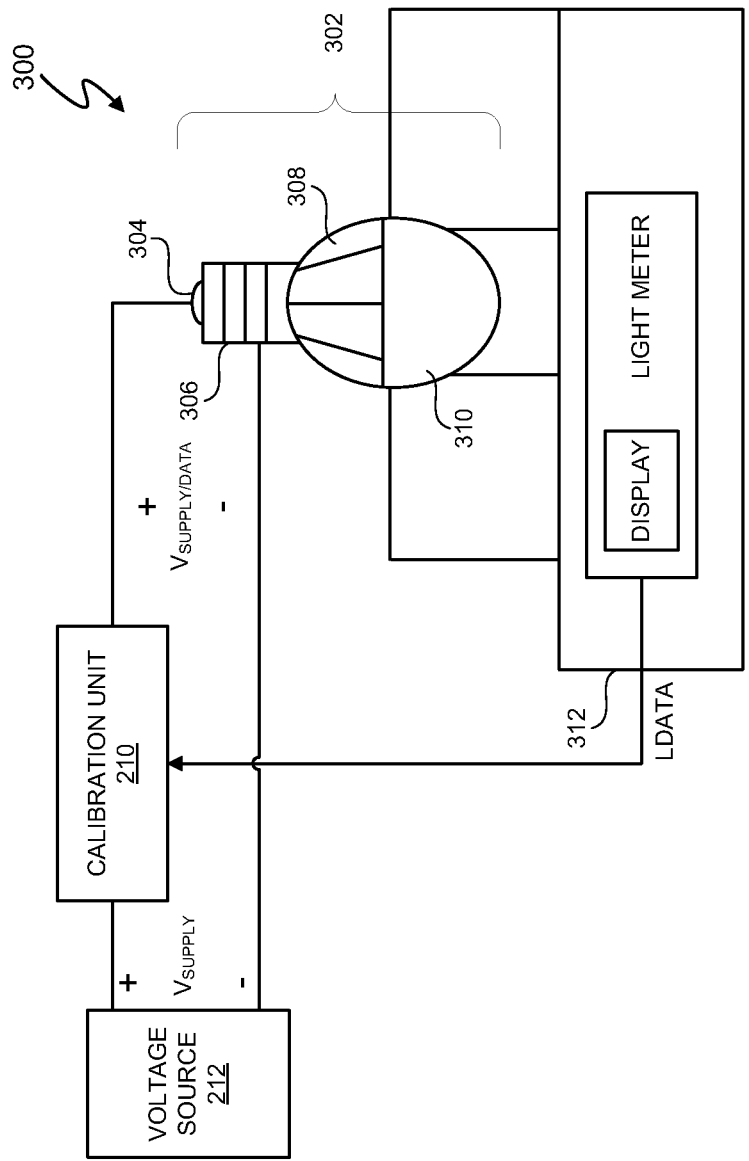
FIG. 3 depicts a lamp calibration system that receives supply voltage/calibration data via power terminals of a lamp.

FIG. 3 depicts lamp calibration system 300, which represents one embodiment of lamp calibration system 200. Referring to FIGS. 2 and 3, the particular, physical configuration of lamp 204 is a matter of design choice. In lamp calibration system 300, lamp 302 represents one embodiment of lamp 204. Lamp 302 includes power terminals 304 and 306 to receive supply voltage/calibration data $V_{SUPPLY/DATA}$ during calibration. The power control circuit 214 is located in housing 308, and light source 216 is located in translucent cover 310. The lamp 302 is either manually or automatically positioned in test apparatus 312 for calibration. In at least one embodiment, light meter 220 is mounted within test apparatus 312.

Figure 4:
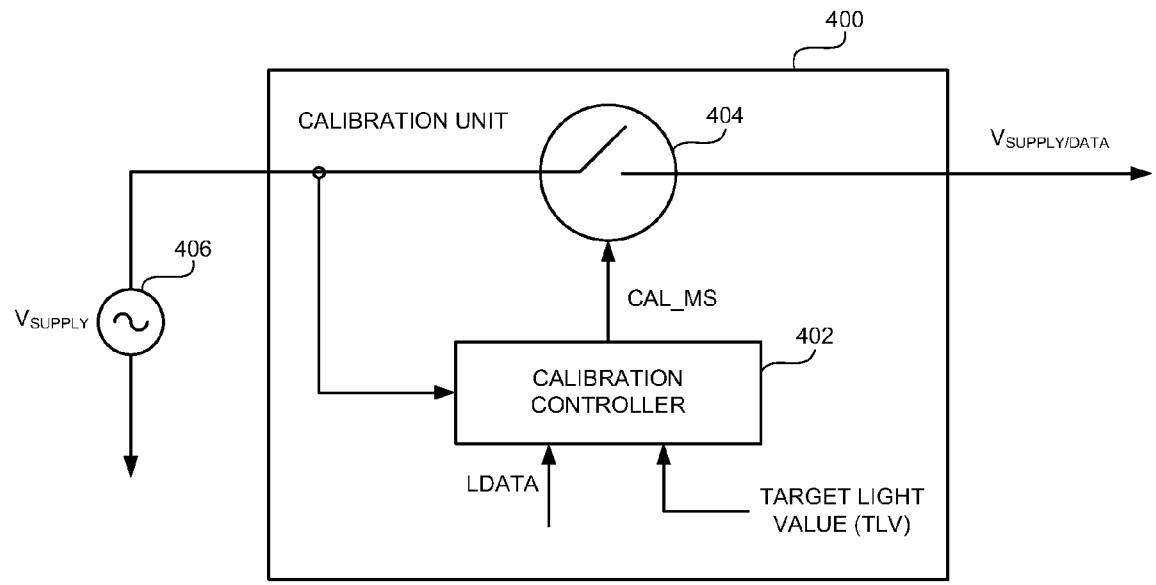
FIG. 4 depicts a calibration unit embodiment for the lamp calibration system of FIG. 2.

FIG. 4 depicts calibration unit 400, which represents one embodiment of calibration unit 210. Calibration unit 400 includes a calibration controller 402 that receives lighting data signal LDATA and target light value TLV. In at least one embodiment, the target light value TLV is stored in a memory (not shown). The value of target light value TLV represents the target value of lighting data signal LDATA. Calibration unit 400 compares the target light value TLV with the lighting data signal LDATA and generates calibration modulation signal CAL_MS. Switch 404 is connected between voltage source 406 and power terminal 206. The calibration modulation signal CAL_MS operates switch 404 to phase modulate the AC voltage supply $V_{SUPPLY}$ to generate supply voltage/calibration data $V_{SUPPLY/DATA}$. As subsequently described in more detail, in at least one embodiment, the particular phase angle of each half cycle of supply voltage/calibration data $V_{SUPPLY/DATA}$ represents either a logical "1" or a logical "0". Thus, the calibration modulation signal CAL_MS encodes data, including calibration data, as a binary bit stream in the supply voltage/calibration data $V_{SUPPLY/DATA}$ by controlling the phase angles in the phase modulated supply voltage/calibration data $V_{SUPPLY/DATA}$. The calibration controller 402 samples the voltage supply $V_{SUPPLY}$ and phase locks to the voltage $V_{SUPPLY}$ to allow calibration modulation signal CAL_MS to accurately generate the phase angles in supply voltage/calibration data $V_{SUPPLY/DATA}$.

The particular type of phase modulation by calibration controller 402 is a matter of design choice. Calibration controller 402 can be configured to identically phase modulate each half cycle of supply voltage $V_{SUPPLY}$ or independently modulate leading, trailing, or both leading and trailing edges of each half cycle of voltage supply $V_{SUPPLY}$.

Other types of phase modulation encoding schemes can be used to encode supply voltage/calibration data $V_{SUPPLY/DATA}$ with calibration data. For example, calibration controller 402 can be configured to phase modulate leading edges of each half cycle of a cycle of supply voltage $V_{SUPPLY}$ to encode a logical "1" and phase modulate trailing edges of each half cycle of supply voltage $V_{SUPPLY}$ to encode a logical "0". The particular type of phase modulation encoding scheme is a matter of design choice.

Figure 5:
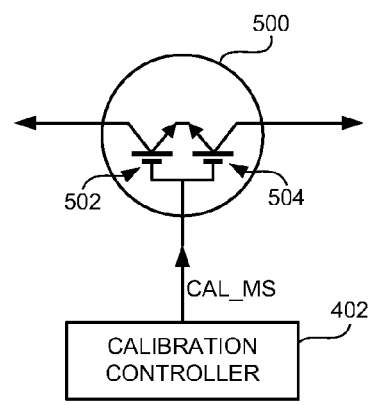
FIG. 5 depicts a switch of the calibration unit of FIG. 4.

Referring to FIGS. 4 and 5, the particular type of switch 404 is a matter of design choice. FIG. 5 depicts switch 500 to phase modulate supply voltage $V_{SUPPLY}$. Switch 500 represents one embodiment of switch 404. Two insulated gate bipolar junction transistors (IGBTs) 502 and 504 with connected emitters form switch 500 to allow calibration controller 402 to phase modulate each half cycle of supply voltage $V_{SUPPLY}$. Calibration controller 402 provides calibration modulation signal CAL_MS to the gates of IGBTs 502 and 504 to control conductivity of IGBTs 502 and 504. Controlling the conductivity of IGBTs 502 and 504 controls the phase angles of supply voltage $V_{SUPPLY}$. In another embodiment, switch 404 is a triac device.

Figure 6:
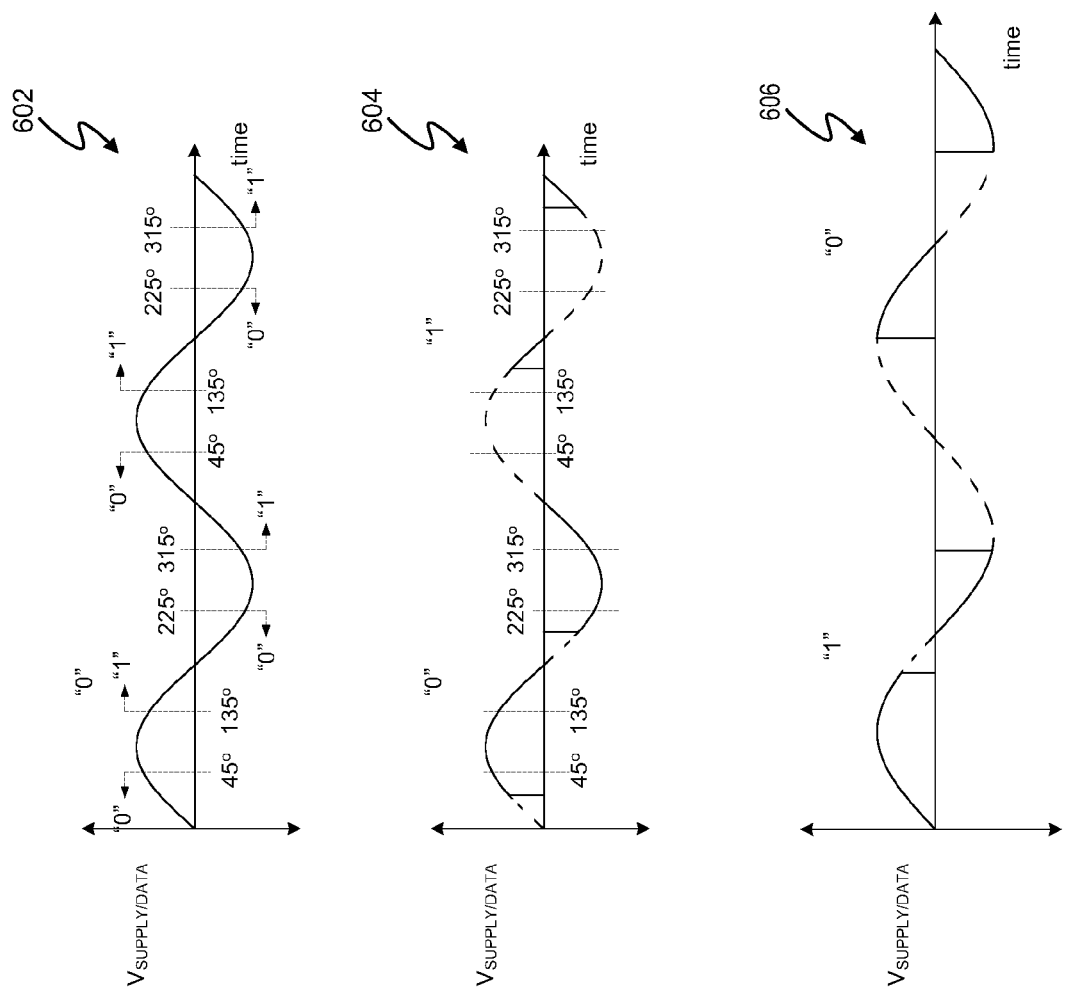
FIG. 6 depicts exemplary phase modulated waveforms of a supply voltage/calibration data of the calibration unit of FIG. 4.

FIG. 6 depicts exemplary phase modulated waveforms of supply voltage/calibration data $V_{SUPPLY/DATA}$. In at least one embodiment, to help ensure accurate decoding by controller 202 (FIG. 2), phase angles indicating logical "0" and logical "1" are sufficiently separated to avoid overlap and, thus, ambiguity as to the encoded data. For example, for each cycle of supply voltage/calibration data $V_{SUPPLY/DATA}$ 602, phase angles from 0° to 45° in the first half cycle and phase angles from 180° and 225° of supply voltage/calibration data $V_{SUPPLY/DATA}$ indicate a logical "0". For each cycle of supply voltage/calibration data $V_{SUPPLY/DATA}$ 602, Phase angles from 135° to 180° in the first half cycle and phase angles from 315° and 360° of supply voltage/calibration data $V_{SUPPLY/DATA}$ indicate a logical "1". Exemplary supply voltage/calibration data $V_{SUPPLY/DATA}$ 604 encodes "0110". Exemplary supply voltage/calibration data $V_{SUPPLY/DATA}$ 606 encodes "10" by phase modulating trailing edges of each half cycle of a cycle supply voltage/calibration data $V_{SUPPLY/DATA}$ followed by phase modulating leading edges of each half cycle.

Figure 7:
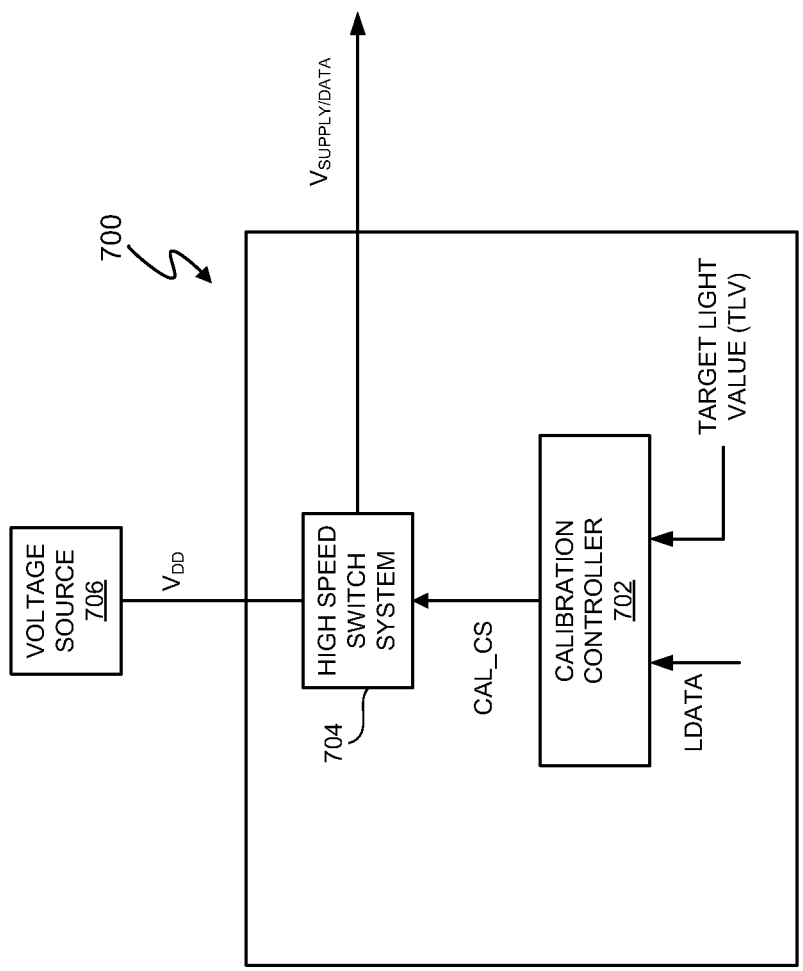
FIG. 7 depicts a high speed calibration unit embodiment for the lamp calibration system of FIG. 2.

FIG. 7 depicts calibration unit 700, which represents one embodiment of calibration unit 210. Calibration unit 700 includes calibration controller 702. Calibration controller 702 compares the lighting data signal LDATA with the target light value TLV as previously described to determine the calibration data to provide to controller 202 (FIG. 2) so as to bring lamp 204 within a tolerance level. Calibration controller 702 generates a pulse width modulated calibration modulation signal CAL_CS to control the duty cycle of high speed switch system 704. Voltage source 706 supplies a DC supply voltage $V_{DD}$ to high speed switch system 704. Voltage source 706 represents one embodiment of voltage source 212 (FIG. 2). High speed switch(es) 704 modulate the supply voltage $V_{DD}$ to generate a pulse width modulated supply voltage/calibration data $V_{SUPPLY/DATA}$. Variations in the duty cycle of calibration modulation signal CAL_CS represent encoded binary data in supply voltage/calibration data $V_{SUPPLY/DATA}$. The frequency of calibration modulation signal CAL_CS determines the data transfer rate of supply voltage/calibration data $V_{SUPPLY/DATA}$. The data transfer rate using calibration controller 702 can be much larger than the data transfer rate achievable with calibration unit 400 because the data transfer rate of calibration controller 702 is dependent on the frequency of calibration modulation signal CAL_CS and responsiveness of high speed switch system 704 rather than on the frequency of the supply voltage $V_{SUPPLY}$.

Figure 9:
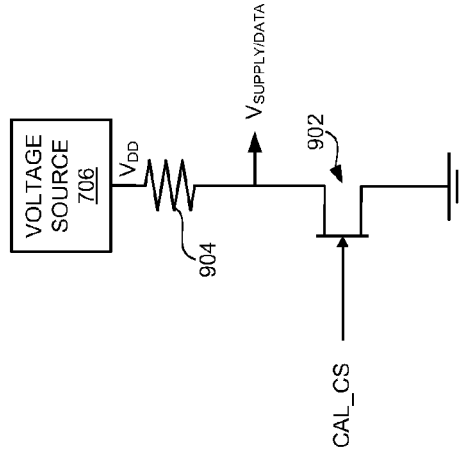
FIG. 9 depicts a respective high speed switch system for the high speed calibration unit of FIG. 7.
Figure 8:
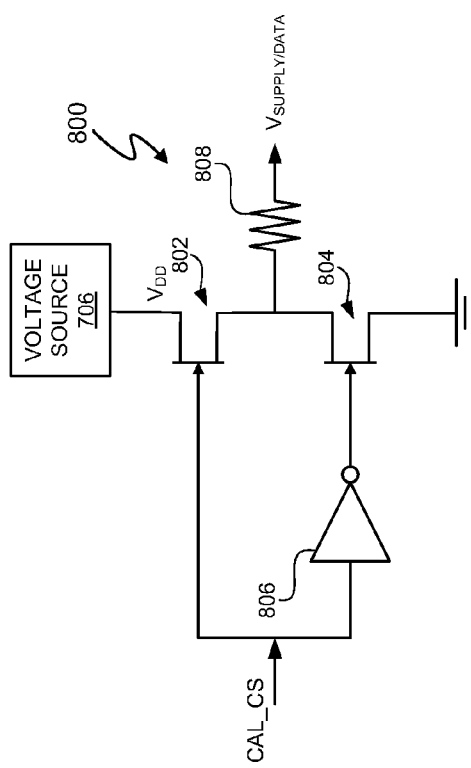
FIG. 8 depicts a high speed switch for the high speed calibration unit of FIG. 7.

FIG. 8 depicts high speed switch system 800, which represents one embodiment of high speed switch system 704. The calibration modulation signal CAL_CS is applied directly to the gate of n-channel field effect transistor (FET) 802 and indirectly to the gate of n-channel FET 804 through inverter 806. Resistor 808 limits the current supplied by voltage source 706 (FIG. 7). Referring to FIGS. 2 and 9, the value of resistor 808 is selected so that an adequate amount of current $i_{LS}$ is supplied to light source 216 to generate a desired brightness of light 218. Referring to FIG. 8, the duty cycle of each pulse of supply voltage/calibration data $V_{SUPPLY/DATA}$ tracks the duty cycle of each pulse of calibration modulation signal calibration modulation signal CAL_CS. Thus, the data indicated by the duty cycle of each pulse of calibration modulation signal CAL_CS is encoded in supply voltage/calibration data $V_{SUPPLY/DATA}$.

FIG. 9 depicts high speed switch system 900, which also represents one embodiment of high speed switch system 704. The calibration modulation signal CAL_CS is applied directly to the gate of n-channel FET 902. Resistor 904 limits the current supplied by voltage source 706 (FIG. 7). Referring to FIGS. 2 and 9, the value of resistor 808 is selected so that an adequate amount of current $i_{LS}$ is supplied to light source 216 to generate a desired brightness of light 218. Referring to FIG. 9, the duty cycle of each pulse of supply voltage/calibration data $V_{SUPPLY/DATA}$ tracks the duty cycle of each pulse of calibration modulation signal calibration modulation signal CAL_CS. Thus, the data indicated by the duty cycle of each pulse of calibration modulation signal CAL_CS is encoded in supply voltage/calibration data $V_{SUPPLY/DATA}$. Referring to FIGS. 8 and 9, high speed switch system 900 contains fewer components than high speed switch system 800. However, unlike high speed switch system 800, current flows in high speed switch system 900 regardless of the logical value of calibration modulation signal CALIBRATION MODULATION SIGNAL CAL_CS, which is generally less efficient.

Figure 10:
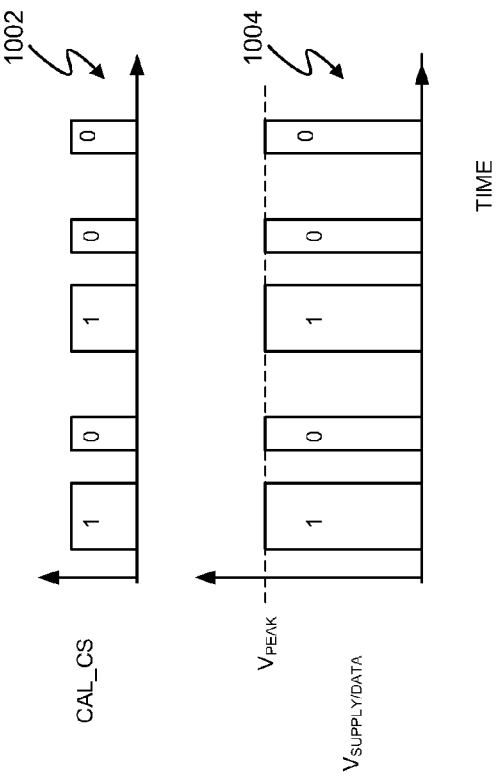
FIG. 10 depicts exemplary high speed encoding of supply voltage/calibration data by a calibration modulation signal of the high speed calibration unit of FIG. 7.

FIG. 10 depicts exemplary encoding of supply voltage/calibration data $V_{SUPPLY/DATA}$ by calibration modulation signal CAL_CS. Referring to FIGS. 7 and 10, calibration controller 702 duty cycle modulates calibration modulation signal CAL_CS to encode calibration data in supply voltage/calibration data $V_{SUPPLY/DATA}$ based on the comparison between the lighting data LDATA and the target light value TLV. In at least one embodiment, a duty cycle of calibration modulation signal CAL_CS greater than or equal to 75% represents a logical "1", and a duty cycle less than or equal to 25% represents a logical "0". The exemplary calibration modulation signal CAL_CS 1002 represents binary data "10100". Calibration unit 700 modulates the supply voltage $V_{DD}$ to encode supply voltage/calibration data $V_{SUPPLY/DATA}$ 1004 with the same binary data as calibration modulation signal CAL_CS 1002. The peak voltage $V_{PEAK}$ of supply voltage/calibration data $V_{SUPPLY/DATA}$ is maintained so that the average voltage of supply voltage/calibration data $V_{SUPPLY/DATA}$ provides sufficient operating voltage to lamp 204.

Figure 11:
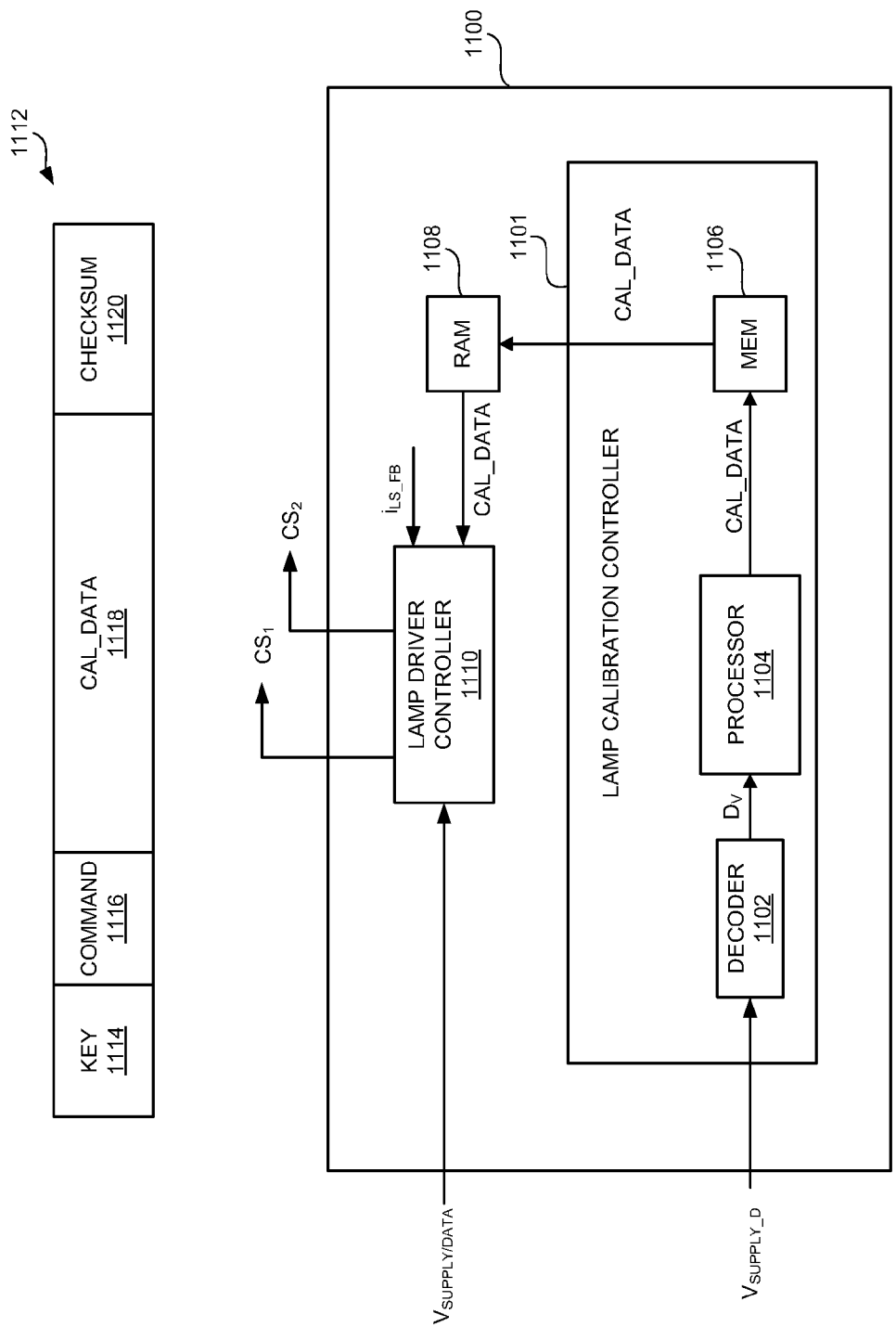
FIG. 11 depicts an embodiment of a controller of the lamp calibration system of FIG. 2.

FIG. 11 depicts controller 1100, which represents one embodiment of controller 202. Controller 1100 includes two controllers, lamp calibration controller 1101 and lamp driver controller 1110. Lamp calibration controller 1101 is active during calibration mode to allow controller 1100 to calibrate lamp 204. In at least one embodiment, lamp calibration controller 1101 is inactive after completion of calibration. In at least one embodiment, lamp calibration controller 1101 is used to decode and process dimming levels indicated by phase angles in $V_{SUPPLY\_D}$ during normal use. Lamp driver controller 1110 generates control signal $CS_1$ to control lamp driver 222 and generates control signal $CS_2$ to directly control current in light source 216. Lamp calibration controller 1101 receives data signal $V_{SUPPLY\_D}$, which contains the data encoded in supply voltage/calibration data $V_{SUPPLY/DATA}$. In at least one embodiment, the supply voltage/calibration data $V_{SUPPLY/DATA}$ received by lamp driver controller 1110 is a sampled version of supply voltage/calibration data $V_{SUPPLY/DATA}$. In one embodiment, data signal $V_{SUPPLY\_D}$ is supply voltage/calibration data $V_{SUPPLY/DATA}$. In another embodiment, data signal $V_{SUPPLY\_D}$ is a sampled value of supply voltage/calibration data $V_{SUPPLY/DATA}$. In at least one embodiment, data signal $V_{SUPPLY\_D}$ is a sampled value of supply voltage/calibration data $V_{SUPPLY/DATA}$ sampled prior to any electromagnetic interference filtering. Decoder 1102 decodes the data encoded in data signal $V_{SUPPLY\_D}$ and generates data signal $D_V$. Processor 1104 processes data signal $D_V$ to determine the calibration data CAL_DATA provided by calibration unit 210. As subsequently described in more detail, controller 1100 utilizes the calibration data CAL_DATA to calibrate lamp 204. Processor 1104 writes the calibration data CAL_DATA to nonvolatile memory 1106 and writes calibration data CAL_DATA to random access memory (RAM) 1108 during calibration and during normal use of lamp 204. As subsequently described, in at least one embodiment, processor 1104 is a state machine.

Lamp driver controller 1110 receives light source current feedback signal $i_{LS\_FB}$ representing the current in light source 216. In at least one embodiment, lamp driver controller 1110 utilizes the calibration data CAL_DATA as a target value to compare against the light source current feedback signal $i_{LS\_FB}$. The lamp driver controller 1110 then adjusts the control signal $CS_2$ to drive the light source current feedback signal $i_{LS\_FB}$ towards the target value indicated by calibration data CAL_DATA. Thus, for example, if the calibration data CAL_DATA indicates that light source 216 is not bright enough, lamp driver controller 1110 generates control signal $CS_1$ to cause lamp driver 216 to increase the current in light source 216. If the calibration data CAL_DATA indicates that light source 216 is too bright, lamp driver controller 1110 generates control signal $CS_1$ to cause lamp driver 216 to decrease the current in light source 216. Thus, in at least one embodiment the calibration data CAL_DATA represents a predefined target value plus or minus an offset value. In at least one embodiment, supply voltage/calibration data $V_{SUPPLY/DATA}$ supplies the offset value.

Referring to FIGS. 2 and 11, calibration unit 210 encodes supply voltage/calibration data $V_{SUPPLY/DATA}$ in data packet 1112. The particular data format of data packet 112 is a matter of design choice. In at least one embodiment, data packet 1112 has a predetermined format of four data blocks. Data packet 1112 includes a key block 1114. Key block 1114 contains a binary sequence that alerts lamp calibration controller 1101 to enter calibration mode. Data packet 1112 also includes a command block 1116. The data in command block 1116 represents specific commands to be executed by processor 1104. The CAL_DATA block 1118 contains the calibration data. The checksum block 1120 contains a checksum to allow processor 1104 to determine whether the data in supply voltage/calibration data $V_{SUPPLY/DATA}$ and data signal $V_{SUPPLY\_D}$ are accurate or corrupted.

Figure 12:
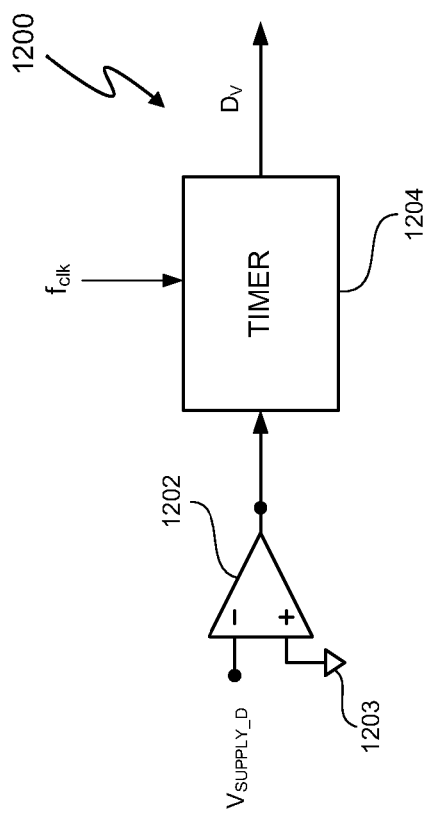
FIG. 12 depicts a decoder of the controller of FIG. 11.

FIG. 12 depicts decoder 1200, which represents one embodiment of decoder 1102. Comparator 1202 compares data signal $V_{SUPPLY\_D}$ against a known reference 1203. To detect phase angles of a phase modulated data signal $V_{SUPPLY\_D}$, the reference 1203 is generally the cycle crossover point voltage of data signal $V_{SUPPLY\_D}$, such as a neutral potential of voltage source 212. To detect duty cycles of a pulse width modulated data signal $V_{SUPPLY\_D}$, the reference 1203 is a potential representing a logical zero. The timer 1204 counts the number of cycles of clock signal $f_{clk}$ that occur until the comparator 1202 indicates an edge of data signal $V_{SUPPLY\_D}$. Digital data $D_V$ represents the count. Since the frequency of data signal $V_{SUPPLY\_D}$ and the frequency of clock signal $f_{clk}$ is known, the phase angle can be determined from the count of cycles of clock signal $f_{clk}$ that occur until the comparator 1202 indicates that an edge of data signal $V_{SUPPLY\_D}$ is present, e.g. upon transition of a logical state of an output of comparator 1202 from one logical state to another. Likewise, the duty cycle can be determined from the count of cycle of clock signal $f_{clk}$ that occur between edges of data signal $V_{SUPPLY\_D}$.

Figure 13:
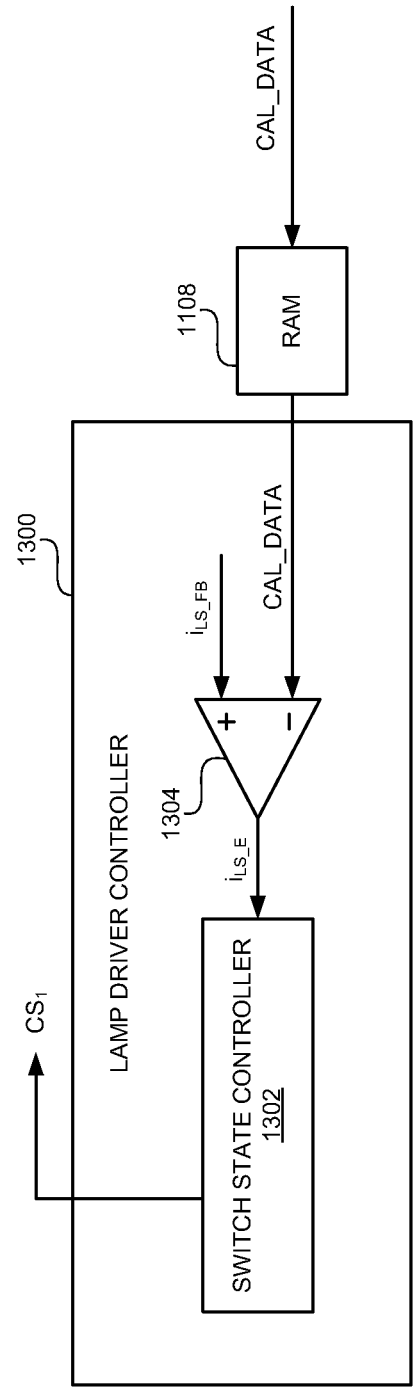
FIG. 13 depicts a lamp driver controller of the controller of FIG. 11.

FIG. 13 depicts lamp driver controller 1300, which represents one embodiment of lamp driver controller 1110. Lamp driver controller 1300 receives calibration data CAL_DATA from RAM 1108. Comparator 1304 compares the light source current feedback signal $i_{LS\_FB}$ with calibration data CAL_DATA. Referring to FIGS. 2 and 13, in at least one embodiment, the calibration data CAL_DATA is set so that when the light source current feedback signal $i_{LS\_FB}$ matches the calibration data CALIBRATION DATA CAL_DATA, the brightness of light source 216 is within a tolerance level. Error signal $i_{LS\_E}$ represents the difference between light source current feedback signal $i_{LS\_FB}$ and calibration data CAL_DATA. In at least one embodiment, if the error signal $i_{LS\_E}$ indicates that light source current feedback signal $i_{LS\_FB}$ is greater than calibration data CALIBRATION DATA CAL_DATA, the switch state controller 1302 is configured to generate control signal $CS_1$ to cause the current in light source 216 to decrease. Likewise, if the error signal $i_{LS\_E}$ indicates that light source current feedback signal $i_{LS\_FB}$ is less than calibration data CALIBRATION DATA CAL_DATA, the switch state controller 1302 is configured to generate control signal $CS_1$ to cause the current in light source 216 to increase. U.S. patent application Ser. No. 12/047,249, entitled "Ballast for Light Emitting Diode Light Sources", inventor John L. Melanson, assignee Cirrus Logic, Inc., and filed on Mar. 12, 2008 (referred to herein as "Melanson II") and U.S. patent application Ser. No. 11/864,366, entitled "Time-Based Control of a System having Integration Response," inventor John L. Melanson, assignee Cirrus Logic, Inc., and filed on Sep. 28, 2007 (referred to herein as "Melanson III") describe exemplary methods and systems including an exemplary switch state controller 1302. Melanson II and Melanson III are hereby incorporated by reference in their entireties.

Figure 14:
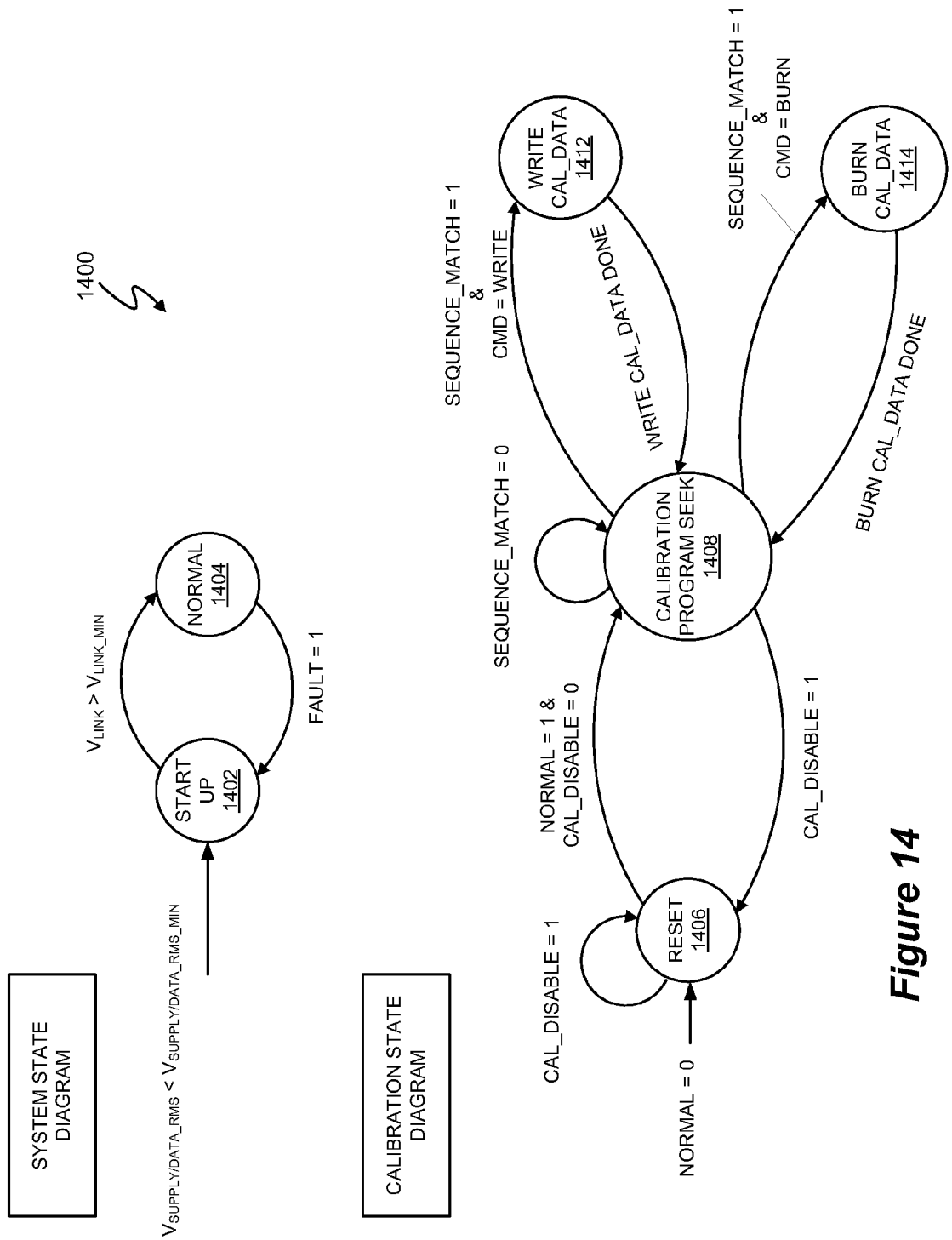
FIG. 14 depicts a state diagram for a processor of the controller of FIG. 11.

FIG. 14 represents state machine diagram 1400, which represents one embodiment of a state machine for processor 1104. Referring to FIGS. 11 and 14, if the root mean square (RMS) value of supply voltage/calibration data $V_{SUPPLY/DATA\_RMS}$ is less than a predetermined minimum supply voltage/calibration data $V_{SUPPLY/DATA\_RMS\_MIN}$, then processor 1104 enters a startup state 1402. If the link voltage $V_{LINK}$ is greater than a minimum link voltage $V_{LINK\_MIN}$, the processor 1104 enters a normal use state 1404. In at least one embodiment, the predetermined minimum supply voltage/calibration data $V_{SUPPLY/DATA\_RMS}$_MIN is 90V RMS, and the minimum link voltage $V_{LINK\_MIN}$ is 380 VDC. After start up and before the processor 1104 enters the normal use state 1404, a NORMAL bit is set to 0, and processor 1104 resets in the reset state 1406 and continues in the reset state 1406 if bit CAL_DISABLE=1 until $V_{LINK}$ is greater than the minimum link voltage $V_{LINK\_MIN}$. In at least one embodiment, the CAL_DISABLE bit=1 prevents the processor 1104 from reentering calibration mode regardless of the data encoded in $V_{SUPPLY\_D}$. Once processor 1104 enters the normal use state 1404, the NORMAL bit is set to 1. If the CAL_DISABLE bit=0, the processor 1104 enters a calibration program seek state 1408. In the calibration program seek state 1408, processor 1104 analyzes the data in data signal $V_{SUPPLY\_D}$ from calibration unit 210 to determine if the key block 1114 of data signal $V_{SUPPLY\_D}$ contains a predetermined calibration start sequence of bits instructing processor 1104 to enter calibration mode. In at least one embodiment, the calibration start sequence is 0110110110. If the key block 1114 contains the calibration start sequence and processor 1104 determines that the sum of the bits in data packet 1112 match the checksum in checksum block 1120, processor 1104 sets a SEQUENCE_MATCH bit to 1. Otherwise, the SEQUENCE_MATCH bit is set to 0.

If the SEQUENCE_MATCH bit is set to 1, processor 1104 executes the command indicated by the bit(s) in command block 1116 send from calibration unit 210. In at least one embodiment, calibration unit 210 commands lamp calibration controller 1101 to temporarily write calibration data CAL_DATA to memory (such as memory 1106) until lamp 204 is within a tolerance level. In at least one embodiment, calibration unit 210 commands lamp calibration controller 1101 to permanently write calibration data CAL_DATA to memory (such as memory 1106) when lamp 204 is within a tolerance level. If the command is a "write" command, from the write CAL_DATA state 1412 processor 1104 writes the calibration data CAL_DATA to memory 1106 and then returns to the calibration program seek state 1408. If the command is a "burn" command, from the burn CAL_DATA state 1414 processor 1104 burns the calibration data calibration data CAL_DATA to memory 1106 so that calibration data CAL_DATA is permanently stored in memory 1106 and then returns to the calibration program seek state 1408. In at least one embodiment, the "write" command allows the lamp 204 to undergo multiple calibration cycles and, thus, iterate the calibration data CAL_DATA until the lighting data signal LDATA indicates that lamp 204 is within a tolerance level. In at least one embodiment, the number of calibration cycles is limited, and, upon reaching the limit, the lamp calibration system 200 indicates that the lamp 204 failed to operate with an acceptable tolerance level. In at least one embodiment, calibration unit 210 sends the "burn" command if the lighting data signal LDATA indicates that lamp 204 is within an acceptable tolerance level. Thus, after burning the calibration data CAL_DATA in state 1414, processor 1104 enters the calibration program seek state 1408, sets the CAL_DISABLE bit=1, and returns to the reset state 1406 until the lamp 204 enters the startup state 1402 or normal state 1404.

Figure 15:
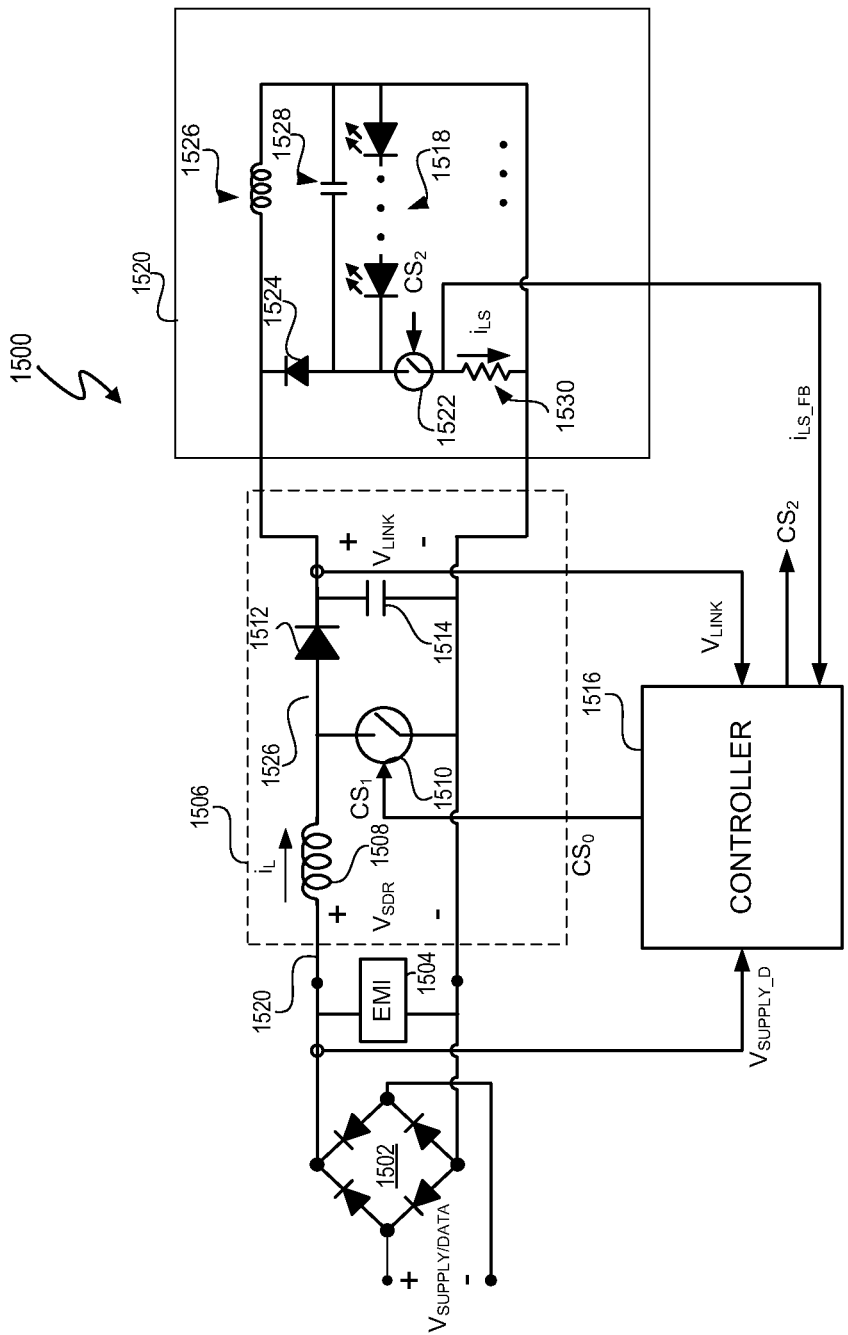
FIG. 15 depicts an embodiment of a lamp.

FIG. 15 depicts lamp 1500, which represents one embodiment of lamp 204. Full-bridge diode rectifier 1502 rectifies supply voltage/calibration data $V_{SUPPLY/DATA}$ into rectified supply voltage/calibration data $V_{SDR}$. In at least one embodiment, data signal $V_{SUPPLY\_D}$ is taken before electromagnetic interference ("EMI") filter 1504 to avoid attenuation of data signal $V_{SUPPLY\_D}$ by EMI filter 1504. Switching power converter 1506 represents one embodiment of lamp driver 222. Switching power converter 1506 is configured as a boost converter such that the inductor current $i_L$ in inductor 1508 ramps up when switch 1510 conducts, thus increasing the voltage across inductor 1508. When switch 1510 stops conducting, diode 1512 conducts, and inductor current $i_L$ charges capacitor 1514 to link voltage $V_{LINK}$. When switch 1510 conducts, diode 1512 prevents capacitor 1514 from discharging through switch 1510.

Controller 1516 represents one embodiment of controller 202 and lamp driver controller 1300. Controller 1516 generates control signal $CS_0$ to provide power factor correction and regulate the link voltage $V_{LINK}$. Exemplary power factor correction and regulation of the link voltage $V_{LINK}$ are described in U.S. patent application Ser. No. 11/967,269, entitled "Power Control System Using a Nonlinear Delta-Sigma Modulator with Nonlinear Power Conversion Process Modeling," inventor John L. Melanson, and filed on Dec. 31, 2007

(referred to herein as "Melanson IV") and U.S. patent application Ser. No. 11/967,275, entitled "Programmable Power Control System," inventor John L. Melanson, and filed on Dec. 31, 2007 (referred to herein as "Melanson V"). Melanson IV and Melanson V are hereby incorporated by reference in their entireties.

Controller 1516 also generates control signals $CS_2$ to control the current in LED string 1518 of light source 1520. LED string 1518 includes one or more LEDs. The voltage across resistor 1530 is fed back as feedback signal $i_{LS\_FB}$ to controller 1516. The feedback signal $i_{LS\_FB}$ represents the current in LED string 1518. Controller 1516 generates $CS_2$ by comparing the feedback signal $i_{LS\_FB}$ calibration data CALIBRATION DATA CAL_DATA as described with reference to lamp driver controller 1300 (FIG. 13). Control signal $CS_2$ controls the duty cycle of switch 1522 to control the average lamp current $i_{LS}$ and, thus, control the brightness of LED string 1518. Diode 1524 permits current flow in only one direction. Inductors 1526 and capacitor 1528 regulate the voltage across the LED string 1518 and provide filtering.

Thus, a lamp includes a controller configured to generate power control signals for a lamp is also configured to receive lamp calibration data received via one or more power terminals of the lamp. The controller is configured to process the calibration data to calibrate the lamp.

Although the present invention has been described in detail, it should be understood that various changes, substitutions and alterations can be made hereto without departing from the spirit and scope of the invention as defined by the appended claims.

What is claimed is:

1. An apparatus comprising:
a controller configured to generate one or more power control signals for a lamp, wherein the controller is further configured in calibration mode to receive lamp calibration data received via one or more power terminals of the lamp and to process the calibration data to calibrate the lamp within a tolerance level and in normal mode receive a phase angle modulated voltage via the one or more power terminals of the lamp to operate the lamp in accordance with the calibration data and the phase angle modulated voltage.

2. The apparatus of claim 1 wherein the calibration data comprises a phase angle modulated, alternating current voltage.

3. The apparatus of claim 1 wherein the calibration data comprises a pulse width modulated voltage.

4. The apparatus of claim 1 wherein the controller is configured for incorporation into a housing of the lamp.

5. The apparatus of claim 1 wherein the controller is configured to calibrate a lamp that comprises one or more light emitting diodes.

6. The apparatus of claim 1 wherein the controller further comprises a decoder to decode the calibration data.

7. The apparatus of claim 1 wherein the controller further includes a processor to process the calibration data and generate output data for use in causing the lamp to meet one or more predetermined specifications.

8. The apparatus of claim 7 wherein the one or more predetermined specifications comprise light output intensity.

9. The apparatus of claim 8 wherein the output data is useful for setting a reference used to adjust current to one or more lamps in the lamp.

10. The apparatus of claim 9 wherein the reference is useful to compare against a feedback value representing the current to the one or more lamps of the lamp.

11. The apparatus of claim 1 wherein the controller is further configured to pulse the lamp to send information.

12. The apparatus of claim 11 wherein the lamp is further configured to pulse the lamp to send information in response to a request from a calibration unit sending the calibration data.

13. The apparatus of claim 1 wherein the tolerance level comprises one or more members of a group consisting of: a specific value, a range of values, and a predetermined brightness level of the lamp.

14. A method comprising:
receiving lamp calibration data via one or more power terminals of a lamp during a calibration mode;
processing the lamp calibration data to calibrate the lamp within a tolerance level during the calibration mode;
receiving a phase angle modulated voltage via the one or more power terminals of the lamp during a normal mode; and
generating one or more power control signals for the lamp using the calibration data and the phase modulated voltage during the normal mode.

15. The method of claim 14 wherein processing the lamp calibration data comprises processing the lamp calibration data using one or more components located within the lamp.

16. The method of claim 14 wherein generating the one or more power control signals comprises generating one or more power control signals using one or more components located within the lamp.

17. The method of claim 14 wherein:
processing the lamp calibration data comprises processing the lamp calibration data using one or more components located within the lamp; and
generating the one or more power control signals comprises generating one or more power control signals using one or more components located within the lamp.

18. The method of claim 14 wherein receiving lamp calibration data comprises receiving phase angle modulated, alternating current voltage.

19. The method of claim 14 wherein receiving lamp calibration data comprises receiving a pulse width modulated voltage.

20. The method of claim 14 wherein receiving lamp calibration data comprises receiving lamp calibration data with a controller disposed in a housing of the lamp.

21. The method of claim 14 wherein processing the calibration data comprises processing the calibration data for a lamp that comprises one or more light emitting diodes.

22. The method of claim 14 further comprising:
decoding the calibration data using a decoder disposed in the lamp.

23. The method of claim 13 wherein generating one or more power control signals further comprises generating output data for use in causing the lamp to meet one or more predetermined specifications.

24. The method of claim 23 wherein the one or more predetermined specifications comprise light output intensity.

25. The method of claim 24 wherein the output data is useful for setting a reference used to adjust current to one or more lamps in the lamp.

26. The method of claim 25 wherein the reference is useful to compare against a feedback value representing the current to the one or more lamps of the lamp.

27. The method of claim 14 further comprising:
pulsing light generated by the lamp to send information.

28. The method of claim 27 further comprising:
receiving a request from a calibration unit that sent the calibration data;

wherein pulsing the lamp to send information comprises pulsing the lamp to send information in response to a request from a calibration unit that sent the calibration data.

29. The method of claim 14 wherein the tolerance level comprises one or more members of a group consisting of: a specific value, a range of values, and a predetermined brightness level of the lamp.

30. An apparatus comprising:
a calibration unit configured to send calibration data to one or more power terminals of a lamp for calibrating the lamp within a tolerance level during a calibration mode of the lamp, wherein the calibration data is distinct from a phase angle modulated voltage received via the one or more power terminals of the lamp during a normal mode of the lamp.

31. The apparatus of claim 30 further comprising:
a controller coupled to the calibration unit and configured to generate one or more power control signals for the lamp, wherein the controller is further configured to receive lamp calibration data received via one or more power terminals of the lamp and to process the calibration data to calibrate the lamp.

32. The apparatus of claim 31 further comprising:
a light meter coupled to the controller and the calibration unit to receive light from the lamp and send data representing one or more properties of the light to the calibration unit.

33. The apparatus of claim 30 wherein the tolerance level comprises one or more members of a group consisting of: a specific value, a range of values, and a predetermined brightness level of the lamp.

* * * * *